United States Patent
Chaudhari et al.

(10) Patent No.: US 11,423,451 B1
(45) Date of Patent: Aug. 23, 2022

(54) SPEECH PROCESSING PROCUREMENT SYSTEM

(71) Applicant: Amazon Technologies, Inc., Seattle, WA (US)

(72) Inventors: Vijay Chaudhari, Seattle, WA (US); Hersh Nagar, Snoqualmie, WA (US); Douglas Scott Cerny, Minneapolis, MN (US); Stephanie Weeks, Mercer Island, WA (US); Srinivasan Sundar Raghavan, Mercer Island, WA (US); Vijaya Prasad Reddy Avula, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 477 days.

(21) Appl. No.: 16/573,939

(22) Filed: Sep. 17, 2019

(51) Int. Cl.
| G06Q 30/00 | (2012.01) |
| G06Q 30/06 | (2012.01) |
| G06N 20/00 | (2019.01) |
| G06F 16/638 | (2019.01) |

(52) U.S. Cl.
CPC ....... *G06Q 30/0601* (2013.01); *G06F 16/638* (2019.01); *G06N 20/00* (2019.01)

(58) Field of Classification Search
None
See application file for complete search history.

(56) References Cited

U.S. PATENT DOCUMENTS

| 10,923,113 B1 * | 2/2021 | Nori ................... G10L 15/1822 |
| 2018/0191884 A1 * | 7/2018 | Goldgraber ....... H04M 3/42221 |
| 2021/0035541 A1 * | 2/2021 | Pande ................... G10H 1/361 |

* cited by examiner

*Primary Examiner* — Mila Airapetian
(74) *Attorney, Agent, or Firm* — K&L Gates LLP

(57) ABSTRACT

Devices and techniques are generally described for a speech processing procurement system. In various examples, recommendations may be provided by back-end systems. The recommendations may be ranked by a machine learning model, and may be sorted and filtered for a particular output device. Various voice guidance workflows may be invoked through user interaction with a speech processing procurement system. The workflows may be used to surface prerecorded voice memos and/or to determine recommendations based on dynamically updated procurement policies.

20 Claims, 8 Drawing Sheets

SPEECH PROCESSING PROCUREMENT SYSTEM

BACKGROUND

Institutions may manage procurement of goods and services through procurement protocols. Policy-based controls and account settings are generally governed by procurement administrators. In electronic procurement systems, administrators guide buyers by managing procurement policies manually. In a multi-seller storefront, the manual policies create considerable user interface complexity for buyers navigating the system with a web browser. In some environments, use of traditional computing devices to procure goods and services may not be available due to the nature of the environment. For example, oil rigs, nursing homes, clean manufacturing rooms, among other controlled environments may be unsuitable for traditional computing devices interfaces such as keyboards and/or displays.

DETAILED DESCRIPTION

Figure 1:
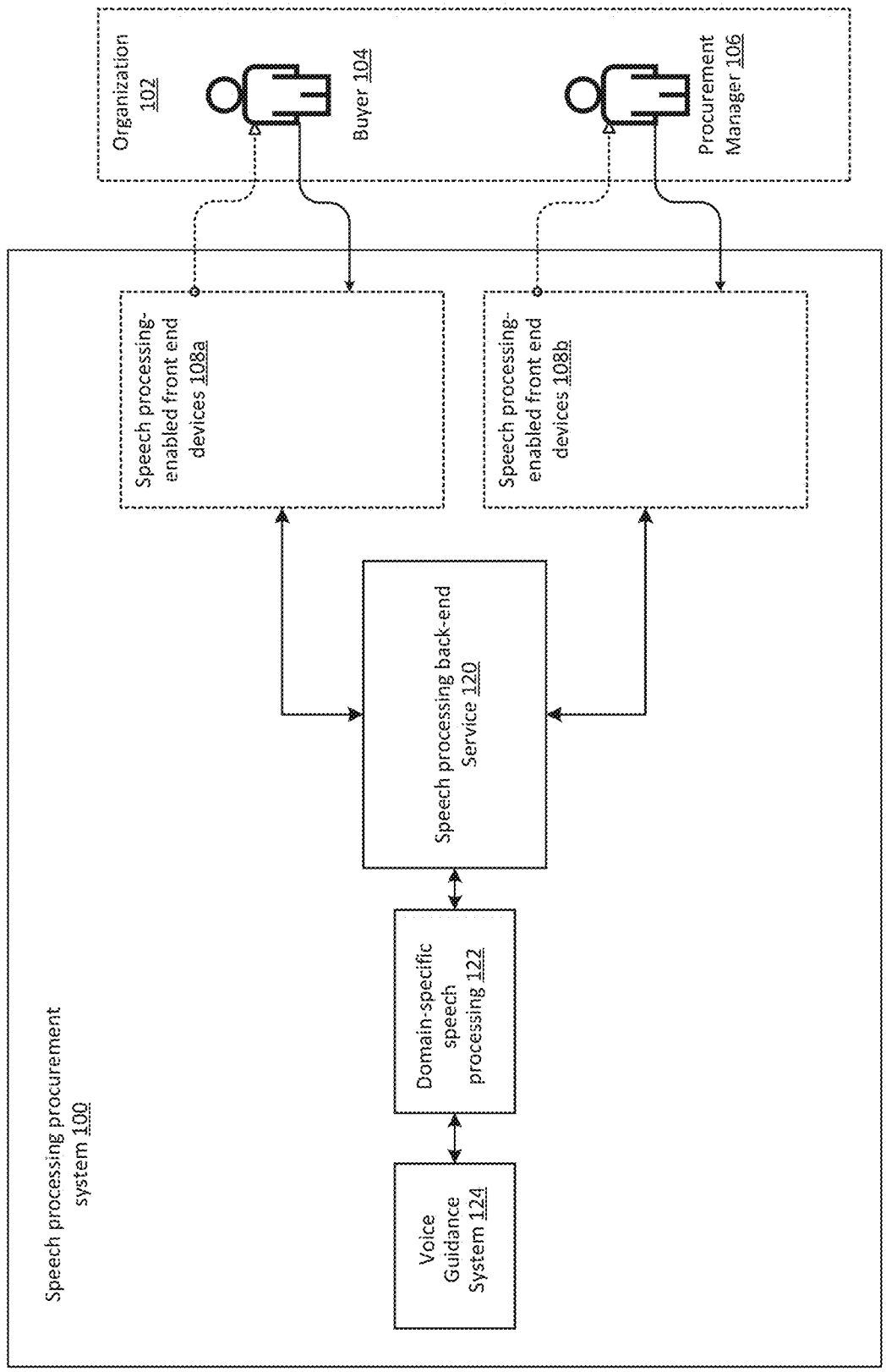
FIG. 1 is a diagram of a system architecture of a speech processing procurement system according to various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Institutional procurement management typically includes oversight of buyers by procurement managers to ensure that the procurement goals of the institution are being met. Described herein are various speech processing procurement technologies that may be implemented to guide buyers according to procurement goals and to provide a voice interface for procurement managers to institute procurement policies, customize voice prompts to buyers, provide voice memos, receive progress/feedback information, and to provide user-specific voice communication including language translation. Although voice prompts are primarily described herein, in various embodiments, any natural language prompt that includes data representing voice audio, text, and/or some combination of voice audio and text may be used.

In some embodiments, traditional computer interfaces (e.g., a computer, keyboard, and mouse) are either unavailable or are not preferred. For example, workers in sterile and/or hazardous work environments may not have access to traditional computer interfaces. In such environments, voice interfaces can be used to guide buyers and/or inform procurement managers in furtherance of procurement policies. Back-end systems may provide recommendations for users of a procurement system (e.g., buyers and/or procurement managers) to take one or more actions. In order to avoid overwhelming the user with a large number of recommendations, some embodiments provide recommendations to a machine learning system that scores, ranks, and filters the recommendations in order to determine the most pertinent and/or important recommendations.

The various speech processing procurement systems provided herein provide the top-ranked recommendations to users as voice prompts. Further, the voice prompts are provided in a preferred language of the user and/or at a particular location and/or device in accordance with user profile data of the receiving user. Additionally, the speech processing procurement systems provided herein allow voice memos to be recorded and later surfaced at the appropriate time, in accordance with work guidance workflows. For example, in an embodiment, a procurement manager can record a voice memo to be played whenever a buyer requests a purchase from a restricted seller. The voice memo can be automatically surfaced and provided to the buyer based on a triggering event (in this case a purchase request from a restricted seller). The triggering event can be a condition that is determined as one or more steps of a voice guidance workflow. In an example, the voice memos can be entered as text or as audio data. If the voice memos are entered as text, the text data is transformed into audio data representing the memo in the preferred language of the target recipient.

In various examples, the speech processing procurement systems described herein are able to provide voice interactions with buyers that can inform buyers of various recommendations with respect to current policies and/or restrictions. Additionally, the speech processing procurement systems can emphasize various content (e.g., sellers and/or items) over other items by providing dialog indicating preferred content. Further, some embodiments of the voice guidance systems described herein employ deep learning techniques to determine, over time, voice prompts that provide the most optimal outcome in terms of the current policies determined by the goals engine. For example, a nudge evaluation and decider engine receives various candidate voice prompts from one or more back-end systems. The nudge evaluation and decider engine scores the various voice prompts using machine learning techniques (described in further detail below). Additionally, the nudge evaluation and decider engine filters out voice prompts that are provided via non-voice interfaces (e.g., visual prompts and/or text of the voice prompts provided through a web interface) and provides the highest ranked voice prompts (e.g., a ranked list) via a voice interface (e.g., through a speech processing enabled device). Additionally, a voice memo manager provides pre-recorded messages in response to a triggering event. For example, a procurement manager can record a voice memo notifying a buyer that a particular item that the buyer has attempted to purchase is restricted. Voice memos may be played back on an appropriate device and in a specified language for the particular user invoking the memo playback by consulting an account management service.

In various examples, the machine learning models of the goals engine used to generate policies are trained using training data comprising a set of goal data that have been annotated with policies associated with the goal data. In one example embodiment, real-time signals are used on a continuous basis to update the machine learning models of the goals engine, as described in further detail below. In another example embodiment, training data are stored for batch training/re-training of the machine learning models of the goals engine. Similarly, in various embodiments, real-time signals and/or batch retraining can be used to train machine learning models of the nudge evaluation and decider engine, as described in further detail below.

FIG. 1 is a diagram of a system architecture of a speech processing procurement system 100 according to various aspects of the present disclosure. In various examples, an organization 102 may be a business and/or other institution implementing a speech processing procurement system. In one embodiment, the organization 102 includes one or more buyers 104 (referred to herein as buyer 104) and/or one or more procurement managers 106 (referred to herein as procurement manager 106).

In an embodiment, buyer 104 communicates with one or more speech processing-enabled front end devices 108a. The speech processing-enabled front end devices 108a comprise one or more microphones (e.g., an array of microphones) and includes wakeword detection components effective to detect a wakeword in audio signals detected by the microphones. Upon detection of a wakeword, the speech processing-enabled front end device 108a is effective to process audio received subsequent to the wakeword, as described below in reference to FIG. 2. In various examples, the processing is performed locally by computing resources of speech processing-enabled front end device 108a, remotely, by sending audio received subsequently to the wakeword over a network to speech processing back-end service 120, and/or via some combination of local and remote processing.

Similarly, in an embodiment, procurement manager 106 is associated with one or more speech processing-enabled front end devices 108b. The speech processing-enabled front end devices 108b may be separate devices relative to speech processing-enabled front end devices 108a, but may be similar in terms of functionality. In various examples, buyer 104 and procurement manager 106 may be located in different geographical locations and thus may each be associated with their own speech processing-enabled front end devices 108a, 108b.

In an example embodiment, speech processing back-end service 120 is a back-end system accessible by speech processing-enabled front end devices 108a, 108b over a network (such as the internet and/or over a local area network). In various examples, speech processing back-end service 120 is effective to perform ASR, NLU, and/or ER processing as described below in reference to FIG. 2. Speech processing back-end service 120 determines one or more intents and/or domains invoked by a natural language input (e.g., text and/or an utterance). For example, a buyer 104 may speak the following request to the speech processing-enabled front end device 108a: "Computer, purchase 25 boxes of sterile nitrile gloves." Audio data representing the utterance (e.g., the online purchase request) may be sent to speech processing back-end service 120. After NLU processing and entity recognition, speech processing back-end service 120 may determine that the request invokes a shopping domain and/or a shopping domain-specific speech processing skill. Accordingly, the intent data, slot data, entity data, text data, and/or other utterance data (e.g., confidence levels in various intents, slots, etc.), is sent to particular speech processing domain (e.g., domain-specific speech processing 122) for further processing. In the current example, the domain can be a voice shopping framework.

Domain-specific speech processing 122 performs domain-specific NLU processing, intent detection, and/or routing of the utterance to generate an enhanced semantic interpretation of the utterance according to the particular domain invoked (e.g., the voice shopping framework). In one embodiment, domain-specific speech processing 122 is speech processing that is tailored to a shopping/procurement domain. In this embodiment, domain-specific speech processing 122 covers identifying an offer (e.g., a product and/or a seller) for purchasing, receiving recommended actions from voice guidance system 124, playing voice memos related to the procurement/finance domain (e.g., sent by voice guidance system 124), placing orders, managing procurement account settings, etc.

In one embodiment, the enhanced semantic interpretation of the utterance is used to select a particular voice guidance workflow defined by a component of voice guidance system 124. The voice guidance workflows consult various back-end systems for data stored and maintained by the back-end systems. For example, a first work flow consults a goals manager to determine policies related to the purchase of a particular product. Additionally, in an embodiment, the workflow consults an account management service to determine a preferred language used to prompt a user. Voice guidance system 124 is effective to define one or more actions to be taken according to the particular voice guidance workflow, as described in further detail below. For example, in one embodiment, a voice guidance workflow directs orders for sterile gloves to a particular seller, according to a current policy favoring the particular seller. Accordingly, the buyer 104's request "Computer, purchase 25 boxes of sterile nitrile gloves," may invoke the workflow related to glove purchases. In an example, the workflow may be configured to generate the response "Ok. Would you like to purchase 25 boxes of sterile nitrile gloves from preferred seller XYZ corp. at $4.59 per box?" In the example, XYZ corp. is a preferred seller of gloves according to the policy. The response—which may be referred to herein as a "nudge" or "voice prompt" used to promote content in accordance with current policies—is output as audio (e.g., synthesized speech) via a TTS module of speech processing back-end service and/or speech processing-enabled front end device 108a.

Logic of voice guidance system 124 is described in further detail below.

Figure 2:
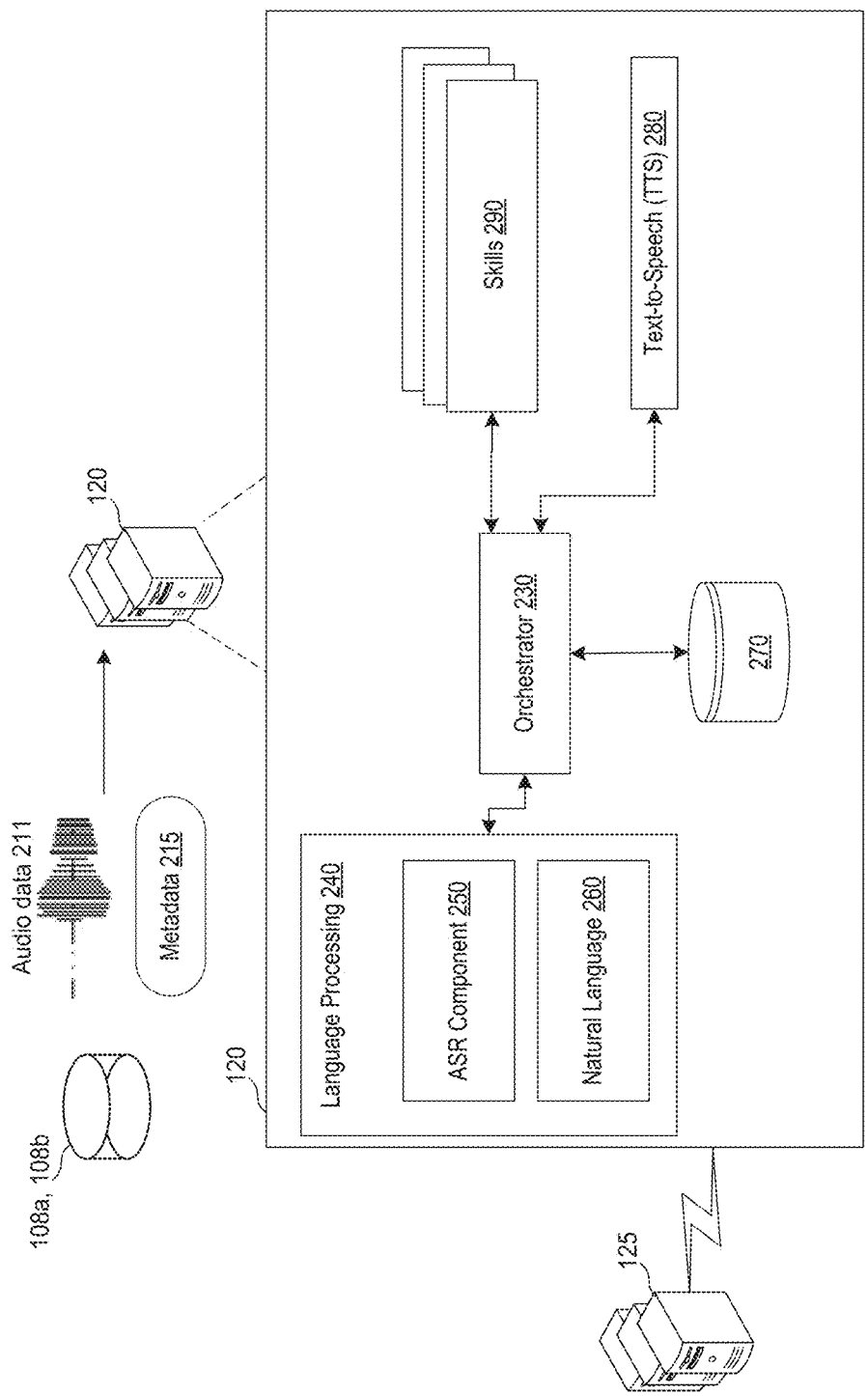
FIG. 2 is an illustrative block diagram of components of a speech processing system, according to various embodiments of the present disclosure.

FIG. 2 is an illustrative block diagram of components of a speech processing system, according to various embodiments of the present disclosure. The various components illustrated FIG. 2 may be located on the same or different physical devices. Communication between various components illustrated in FIG. 2 may occur directly or across one or more network(s). The speech processing-enabled front end devices 108a, 108b may capture audio using an audio capture component, such as the microphone(s) described above. The speech processing-enabled front end devices 108a, 108b may send audio data 211 (e.g., corresponding to an utterance—such as a request to purchase an item, a voice memo from a procurement manager 106 to buyer 104, etc.) to the speech processing back-end service 120. Although various speech processing operations are described as being performed by speech processing back-end service 120 herein, in various other examples, one or more of the speech processing operations may occur locally on speech processing-enabled front end devices 108a, 108b, and/or on some other device communicating via a local area network with speech processing-enabled front end devices 108a, 108b. In addition, the various operations described in reference to FIG. 2 may occur on some combination of speech processing-enabled front end devices 108a, 108b, another computing device(s), and/or speech processing back-end service 120.

As previously described, the speech processing-enabled front end device 108a, 108b may include a wakeword detection component that detects when input audio includes a wakeword. In some instances, the speech processing-enabled front end devices 108a, 108b may be configured to send audio data to the speech processing back-end service 120 when the speech processing-enabled front end device 108a, 108b detects a wakeword. The speech processing-enabled front end device 108a, 108b may also send metadata 215 (e.g., including device identifiers, device type data, contextual data, IP address data, room location data, etc.) to the speech processing back-end service 120. The components depicted in FIG. 2, including components of speech processing back-end service 120 may be generally referred to as spoken language processing components, a spoken language processing system, speech processing components, and/or a speech processing system. Additionally, in various examples, the components depicted in FIG. 2 may process written input (e.g., text data) in addition to spoken input.

Upon receipt by the speech processing back-end service 120, the audio data 211 may be sent to an orchestrator 230. The orchestrator 230 may include memory and logic that enables the orchestrator 230 to initiate a dialog session and to transmit various pieces and forms of data to various components of the system.

The orchestrator 230 may send the audio data 211 (e.g., a spoken request and/or spoken order to purchase one or more items) to a language processing component 240. An ASR component 250 (e.g., a speech recognition component) of the language processing component 240 transcribes the audio data 211 into one or more hypotheses representing speech contained in the audio data 211. The ASR component 250 interprets the speech in the audio data based on a similarity between the characteristics of the audio data corresponding to the speech and pre-established language models. For example, the ASR component 250 may compare the audio data 211 with models for sounds (e.g., subword units such as phonemes) and sequences of sounds to identify words that match the sequence of sounds in the speech represented in the audio data 211. The ASR component 250 may send text data generated thereby to a natural language component 260 of the language processing component 240. The text data output by the ASR component 250 may include a top scoring hypothesis of the speech represented in the audio data 211 or may include an N-best list including a group of hypotheses of the speech represented in the audio data 211, and potentially respective scores ASR processing confidence scores. As previously described, in some other examples, the ASR component 250 (and/or other components of the speech processing back-end service 120) may generate determine user account data associated with the received audio data so that responses may be tailored to the particular user (e.g., buyer 104).

The natural language component 260 attempts to make a semantic interpretation of the phrases or statements represented in the text data input therein. That is, the natural language component 260 determines one or more meanings associated with the phrases or statements represented in the text data based on individual words represented in the text data. The natural language component 260 interprets a text string to derive an intent of the user (e.g., an action that the user desires be performed) as well as pertinent pieces of information in the text data that allow a device (e.g., the speech processing-enabled front end device 108a, 108b, the speech processing back-end service 120, the skill computing device(s) 125, etc.) to complete the intent. For example, if the text data corresponds to "Send a voice memo to Alice," the natural language component 260 may determine the user intended to invoke a communication intent with a target {contact name=Alice}. As previously described, in addition to the NLU intent and slot data, the natural language component 260 may generate other metadata associated with the utterance (e.g., with the audio data 211). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, etc.

As previously described, the speech processing back-end service 120 may include one or more skills 290 configured to perform the various techniques herein disclosed, as well as other, processes. The speech processing back-end service 120 may also be in communication with one or more skill computing device(s) 125 that execute one or more skills (e.g., skills 290) configured to perform the herein disclosed, as well as other, processes.

In various examples, the one or more skill computing device(s) 125 and/or other computing devices may perform domain-specific speech processing 122. In such examples, the domain-specific speech processing 122 may perform domain-specific (e.g., shopping domain specific) NLU models effective to determine a more granular intent and/or perform a domain-specific slot analysis and/or entity recognition analysis to determine the user's intent. In various examples, the voice guidance system 124 may determine one or more voice guidance workflows invoked by the user's intent based on the domain-specific speech processing 122. Operations of domain-specific speech processing 122 and voice guidance system 124 are described in further detail below.

In various examples, the voice guidance workflow may be executed by a skill 290. In at least some examples, the voice guidance workflow may generate text data for output as an audible response by speech processing-enabled front end device 108a and/or 108b. For example, in response to buyer 104's request to buy an item prohibited by a current policy, the invoked voice guidance workflow may specify the response: "This item is prohibited by current policy. Would you like to send a purchase request for this item to your procurement manager?" The orchestrator 230 may send the text data of the response to TTS component 280. TTS component 280 may transform the text data into corresponding audio data. The audio data may be sent by orchestrator 230 over a network to speech processing-enabled front end device 108a, 108b for output as audio. In the example above, the buyer 104 may respond to the question and the response may be processed in accordance with the techniques described above. In various examples, the response may be designated as pertaining to the current dialogue session by orchestrator 230.

The speech processing back-end service 120 may include a non-transitory computer-readable memory 270. Non-transitory computer-readable memory 270 may be effective to store various machine learning models such as NLU and/or ASR models, as described herein.

The TTS component 280 may be effective to synthesize speech (e.g., generate audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components (230/240/250/260/280/290) described above may exist in software, hardware, firmware, or some combination thereof.

The skill computing device(s) 125, the speech processing back-end service 120, the domain-specific speech processing 122, and/or the voice guidance system 124 may reside in a cloud computing environment, a localized computing environment, or some combination thereof. For example, the speech processing-enabled front end device 108a, 108b may include computing equipment, some portion of which is configured with all/some of the components/functionality of speech processing back-end service 120, domain-specific speech processing 122, and/or voice guidance system 124. The speech processing-enabled front end device 108a, 108b may perform a variety of functions on its own (such as when remote communications are unavailable), and/or may communicate (when capable) with remote based speech processing back-end service 120, domain-specific speech processing 122, voice guidance system 124, and/or one or more other computing devices to perform the various functions described herein. Alternatively, all of the functionality may reside on the speech processing-enabled front end device 108a, 108b or remotely.

Figure 3:
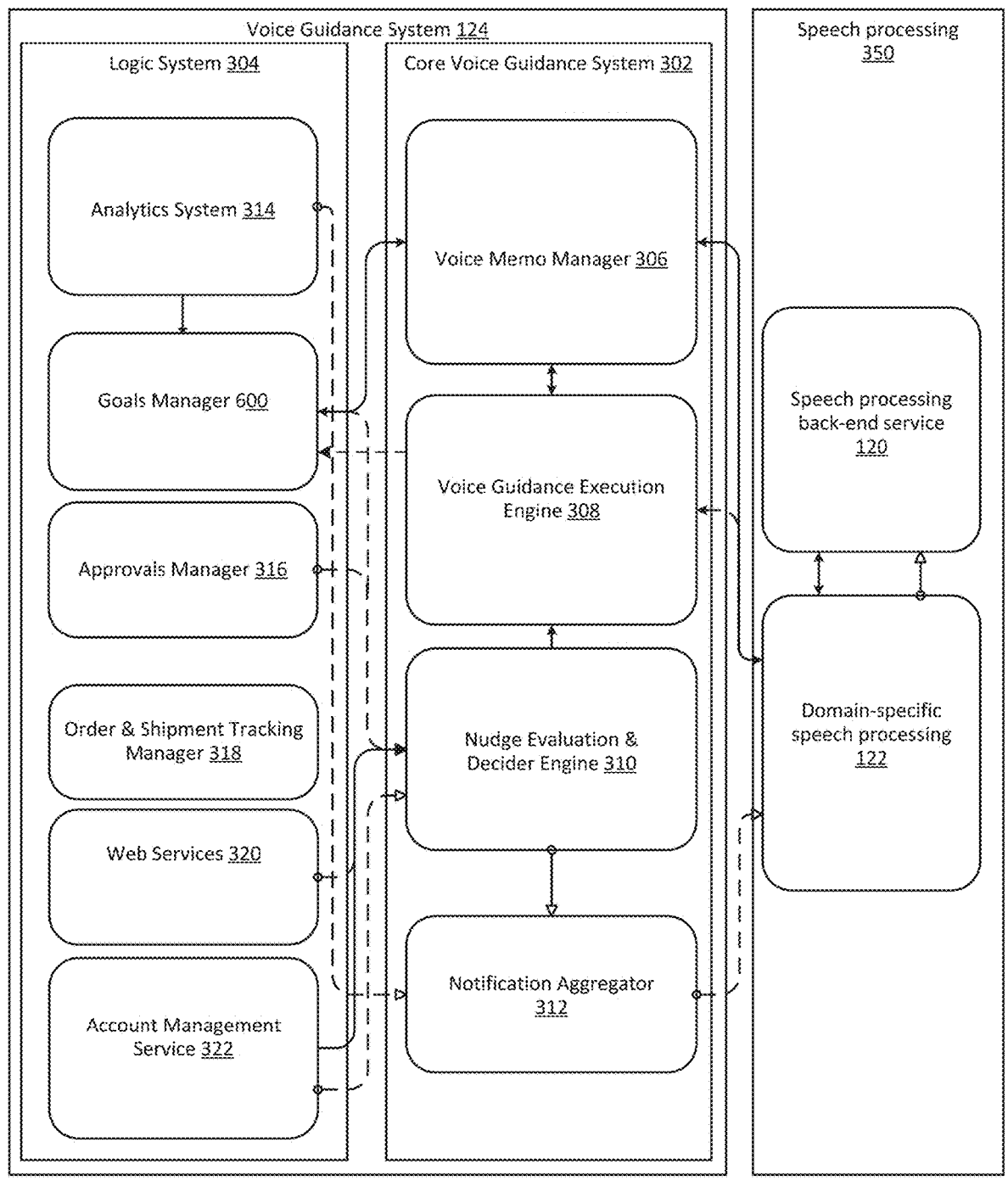
FIG. 3 is a block diagram of speech processing and voice guidance components of the procurement system of FIG. 1, including additional details, according to various embodiments of the present disclosure.

FIG. 3 is a diagram of the speech processing components and voice guidance components of the procurement system of FIG. 1, including additional details, according to various embodiments of the present disclosure. In FIG. 3, speech processing includes speech processing back-end service 120 and domain-specific speech processing 122. As previously described, it should be appreciated that in various embodiments, one or more other computing devices, alone or in combination with speech processing back-end service 120 and domain-specific speech processing 122, may be used to implement the various speech processing techniques described herein. For example, speech processing-enabled front end devices 108a, 108b may implement various components of the speech processing systems described herein. Speech processing 350 describes the various speech processing techniques including speech processing performed by back-end services accessible via the Internet and/or front-end services provided on-device or via a local area network.

In FIG. 3, dashed lines may indicate the flow of notification events (such as nudges, memos, and/or other notifications) and solid lines may indicate the flow of data.

Speech processing back-end service 120 may be effective to perform various speech processing techniques based on signals received from speech processing-enabled front end devices 108a, 108b. For example, speech processing back-end service 120 may receive audio data comprising a request received from buyer 104. Speech processing back-end service 120 may perform ASR to generate text data representing the audio data. Additionally, speech processing back-end service 120 may perform NLU processing to determine one or more slots, intents, and/or named entities present in the spoken request (in the current example, entity recognition is performed as part of NLU processing). In various examples, speech processing back-end service 120 may perform domain routing and/or may provide context-aware dialog and/or orchestration. For example, if the request is related to procurement, speech processing back-end service 120 may route the request (along with the intent data, slot data, entity data, utterance data, etc.) to domain-specific speech processing 122.

In the current example, domain-specific speech processing 122 may be a voice shopping framework. Domain-specific speech processing 122 may comprise domain-specific NLU processing, including intent detection and skill routing. Domain-specific speech processing 122 may provide insights and/or recommendations to the user (e.g., buyer 104) based on the current request. In various examples, domain-specific speech processing 122 may be implemented, at least in part, as a skill 290. Domain-specific speech processing 122 may provide multi-modal support for the various different services provided by the speech processing procurement system 100. In the voice shopping framework example, domain-specific speech processing 122 may include checkout and/or ordering dialogs, and/or orchestration of steps performed by the voice guidance system 124 (e.g., orchestration of workflows of voice guidance system 124 and integration with the domain-specific dialog).

After domain-specific speech processing 122, the request may be sent to voice guidance system 124. Voice guidance system 124 may comprise a core voice guidance system 302 and logic system 304. Core voice guidance system 302 may include voice memo manager 306, voice guidance execution engine 308, nudge evaluation and decider engine 310, and/or notification aggregator 312. Logic system 304 may include analytics system 314, goals manager 600 (described in further detail in reference to FIG. 6), order and shipment tracking manager 318, web service 320, and/or account management service 322.

Domain-specific speech processing 122 may determine that the request invokes a particular workflow (e.g., a voice guidance workflow) of voice guidance execution engine 308. Voice guidance execution engine 308 communicates with goals manager 500 of logic system 304 through an application programming interface (API) of goals manager 500 to determine any policies related to the request. For example, a policy may indicate that the request is for a restricted item, is from a non-preferred seller, exceeds a shipping time threshold, etc. The particular policy and the request may be sent to nudge evaluation and decider engine 310. The nudge evaluation and decider engine 310 may receive the pending action (e.g., a pending transaction, such as a pending order comprising a request to purchase a particular good that is from a non-preferred seller) and recommendation signals from the goals manager 600 (e.g., recommendation signals concerning a preferred action to be taken and/or based on a recommendation to update a procurement policy). In various examples, nudge evaluation and decider engine 310 may determine a number of order attributes associated with a received order (e.g., price, seller, shipping specifications, etc.). The nudge evaluation and decider engine 310 may compare the order to one or more policies. The nudge evaluation and decider engine 310 may evaluate the priority of a particular nudge (e.g., a voice prompt), the severity of the requested action (e.g., in terms of violating a current policy and/or in terms of the amount of spend related to the action), accuracy (e.g., a level of accuracy of the nudge with respect to the request), and confidence score (e.g., a confidence score indicating a confidence that the nudge is appropriate for the particular action requested by the user). A target for the nudge is identified and the nudge details are sent to the notification aggregator 312 for summarization and delivery. In various examples, the nudges (voice prompts) may be received from various components of logic system 304 and/or core voice guidance system 302 (e.g., generally the components of logic system 304 and/or core voice guidance system 302 may be referred to as "back-end" systems or components). For example, in an embodiment, nudges related to recommended items and/or sellers are received from goals manager 600.

Notification aggregator 312 aggregates and summarizes notifications from a variety of sources (e.g., nudges from nudge evaluation and decider engine 310, memos from voice memo manager 306, etc.). Notification aggregator 312 determines the relevant channel to which a particular notification is to be sent. Additionally, notification aggregator 312 summarizes and delivers the notifications to the relevant channel. In various examples, administrative users (e.g., procurement manager 106) may set one or more notification preferences per device. For example, notification preference for a particular device can be used to provide nudges and/or memos during dialog sessions with a user.

In one embodiment, voice memo manager 306 is a system effective to record, store, and/or trigger playback of voice memo messages. Voice memo messages are personalized voice memos recorded by buyer 104, procurement manager 106, and/or another user. In various examples, procurement manager 106 may set voice memos corresponding to particular conditions related to a policy from goals manager 600. For example, a procurement manager 106 may record a voice memo to be played when a buyer 104 attempts to purchase a restricted product. In another example, the procurement manager 106 may record voice memos comprising prompts to take particular action (e.g., purchase from a particular seller, and/or switch from one particular brand of a good to another brand). Voice memo manager 306 may insert the voice memos into the voice purchasing experience of buyer 104. In an embodiment, voice memos are triggered by voice guidance workflows. For example, if buyer 104 attempts to purchase a restricted product, the workflow can retrieve and cause a memo from procurement manager 106 to be played, informing the buyer 104 that the product is restricted. Voice memos may optionally be played back in the procurement manager's voice or in a pre-selected computer-simulated voice. Additionally, in an embodiment, voice memo manager 306 determines a localization and/or a preferred language of an intended recipient of the voice memo from an API of account management service 322 (e.g., by looking up the intended recipient's account in a database). The localization includes a list of devices associated with the intended recipient and preferences for output of voice prompts by such devices including specifications of particular days and/or times of day during which to output voice prompts. In some further examples, the one or more preferences specify conditions for outputting voice prompts (such as only after a user has initiated a dialog with the speech processing-enabled front end devices 108*a*, 108*b*).

In an embodiment, voice memo manager 306 translates the voice memo into the language preferred by the intended recipient and/or into the predominant language or languages used at the location associated with the device (e.g., due to a language preference). Additionally, in at least some examples, the memos may be provided in text format. Voice memo manager 306 may be effective to translate such memos and to output such memos in the appropriate language, at the appropriate device, using a TTS component of speech processing back-end service 120 and/or speech processing-enabled front end device 108*a*. In various examples, voice memo manager 306 may be implemented as a web application, a back-end system, and/or some combination of a web application and a back-end system. In various examples, memos stored by voice memo manager 306 may be output by the system when a buyer 104 requests a purchase or search of a preferred/restricted/blocked item and/or seller (as defined by a current policy). In other examples, memos stored by voice memo manager 306 are output by the system when a current policy indicates that an alternate product and/or seller should be suggested, when a purchase request is sent for approval, and/or when a particular device/location has exceeded an allotted procurement budget.

Analytics system 314 is a back-end portion of logic system 304 that provides visualization of the current spend of the organization 102 and/or of particular buyers 104 of the organization 102. Additionally, analytics system 314 communicates with goals manager 600 to perform automated spend analysis and/or to detect anomalies and/or recommended actions in furtherance of current policies determined by goals manager 500. Further, analytics system 314 provides an interface (e.g., a web interface) to allow procurement manager 106 and/or other administrators to update current policies. Recommendations from analytics system 314 are sent to nudge evaluation and decider engine 310, as described in further detail below.

Goals manager 600 manages specified goals and translates the goals into executable policies using machine learning models and/or pre-coded logic or rules. Additionally, goals manager 600 detects policy conflicts, determines policy non-compliance (e.g., based on incoming buyer requests), and recommends policy changes to administrators. Further, goals manager 600 communicates with nudge evaluation and decider engine 310 to provide voice prompts indicating preferred, restricted, and/or blocked goods and/or services. Goals manager 600 is described in further detail below, in reference to FIG. 6.

Approvals manager 316 manages approvals (e.g., of purchase requests) and can trigger approval actions according to current policies of goals manager 600. Additionally, in some embodiments, approvals manager 316 manages budget(s) based on current policies. Order and shipment tracking manager 318 responds to requests regarding current orders, shipments, approvals (e.g., orders with pending approval status), invoices, etc. Web services 320 receives signals from organization 102's business intelligence systems such as procurement systems, inventory management systems, smart devices (e.g., robotics and/or internet-of-things connected devices), etc. Account management service 322 stores information associated with user accounts (e.g., buyer 104 and/or procurement manager 106 accounts). Additionally, account management service 322 manages account roles and/or permissions, store device settings, store preferred locations, etc., in association with particular devices and/or particular user accounts. Account management service 322 recommends changes in the account structure, roles/permissions, and/or business settings associated with one or more user accounts. Account management service 322 communicates with nudge evaluation and decider engine 310 and/or with voice memo manager 306 to provide information regarding permissions for providing nudges/memos to particular devices and/or accounts and preferred languages and/or devices to which to send memos/nudges. In another embodiment, account management service 322 recommends account setup related changes. For example, account management service 322 may set up finance roles, update permissions for various users, etc.

Figure 4:
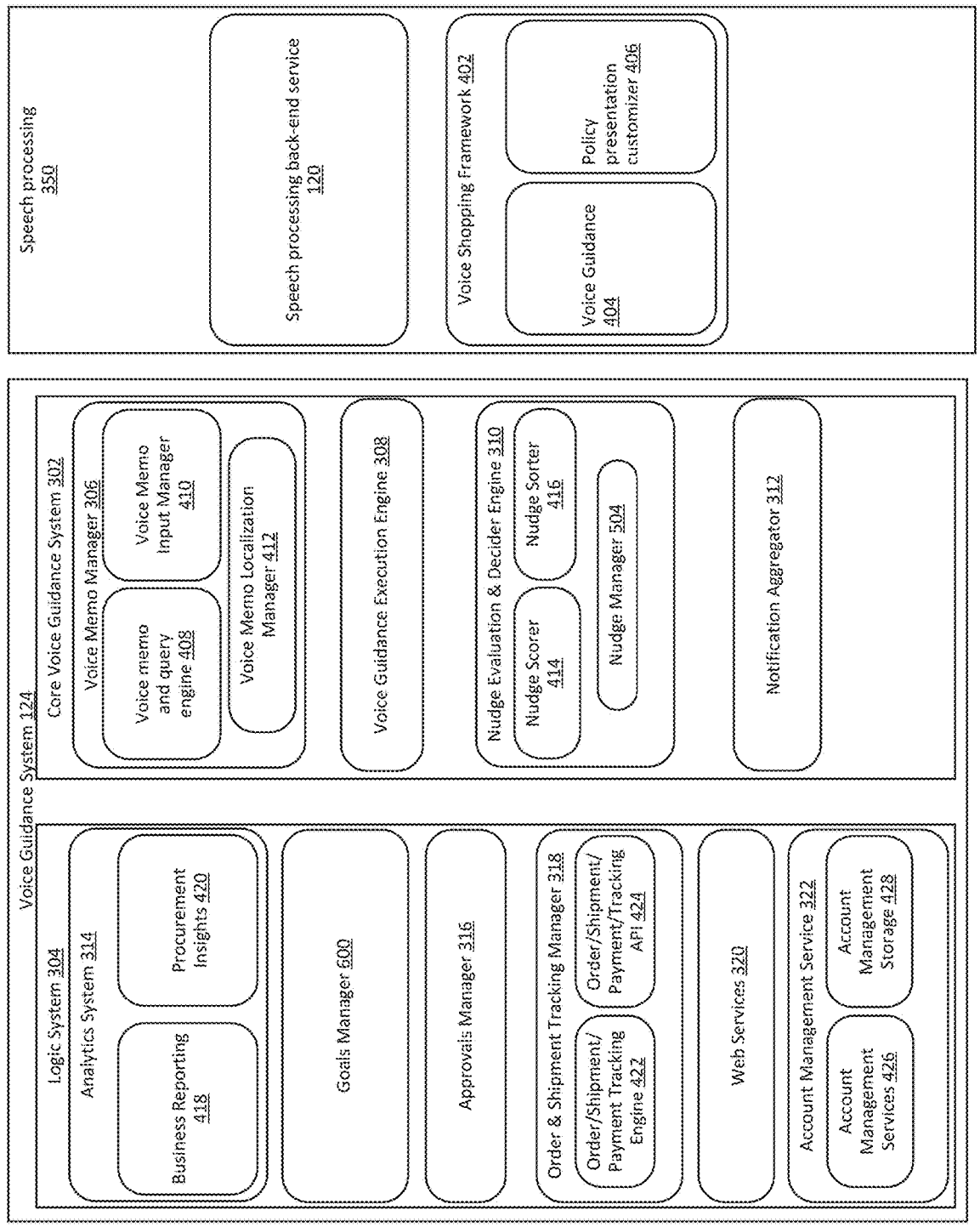
FIG. 4 depicts the speech processing components and voice guidance components of FIG. 3 with additional details, in accordance with various aspects of the present disclosure.

FIG. 4 depicts the speech processing and voice guidance components of FIG. 3 with additional details, in accordance with various aspects of the present disclosure. In FIG. 4, voice shopping framework 402 may be an example of domain-specific speech processing 122 depicted in FIG. 3.

Voice shopping framework 402 comprises voice guidance 404 and policy presentation customizer 406. Voice guidance 404 comprises one or more skills 290 that are effective to detect and recognize user voices in order to identify users. In various examples, such functionality may be optional and may be disabled by users in order to maintain privacy. Additionally, voice guidance 404 determines a particular voice guidance workflow of voice guidance execution engine 308 that has been invoked (e.g., in response to a user's current interaction with the voice shopping framework 402). Additionally, voice guidance 404 comprises policy configuration workflows to allow a user (e.g., procurement manager 106) to set up and/or reconfigure current policies of goals manager 600. Further, voice guidance 404 provides recommendations according to current policies.

Policy presentation customizer 406 provides speech processing notification management for outputting notifications received from notification aggregator 312. Further, policy presentation customizer 406 performs domain-specific NLU and/or entity recognition and provides details regarding checkout and/or ordering.

Voice memo manager 306 comprises a voice memo storage and query engine 408, a voice memo input manager 410, and a voice memo localization manager 412. Voice memo and query engine 408 stores voice memos recorded and/or otherwise input by users of the speech processing procurement system 100 and allows for such memos to be queried in response to a triggering event (e.g., according to a particular step of a voice guidance workflow). Voice memo input manager 410 allows administrators (e.g., procurement manager 106) to define validated and personalized voice memos/prompts to be inserted into the buying experience for buyers 104. Voice memo localization manager 412 translates text-based custom prompts (and/or spoken prompts transformed into text data using ASR processing) into a preferred language of a target user account. A voice memo storage stores previously-recorded and/or previously input voice memos that can be retrieved according to a particular voice guidance workflow and/or in response to a user request (e.g., a spoken request comprising a voice command).

Voice guidance execution engine 308 handles requests from orchestrator 230 of the speech processing system (as implemented in speech processing back-end service 120 and/or voice shopping framework 402). Voice guidance execution engine 308 enables context-aware conversations and provides various voice guidance workflows depending on the semantic content of a user's speech.

Nudge evaluation and decider engine 310 comprises nudge scorer 414 and nudge sorter 416. Nudge scorer 414 receives a variety of recommendations from back-end systems of logic system 304. Nudge scorer 414 scores the pending recommendations (e.g., on a per-device basis). For example, the nudge scorer 414 may receive indications of nudge priority, nudge severity, nudge accuracy, and/or confidence scores for the nudge from the back-end systems of logic system 304. Nudge severity is an optional input to nudge scorer 414 that indicates an importance and/or impact of the recommendation. Nudge priority is an optional input to nudge scorer 414 that indicates how quickly the recommended action needs to occur. In an embodiment, confidence scores are inputs to the nudge priority system indicating a confidence level of the source back-end system in the usefulness of the recommended action. In various examples, nudge scorer 414 may use neural networks and/or collaborative filtering techniques to determine the above-described scores. As previously described, nudge severity and/or nudge priority are optional inputs to nudge scorer 414. In the absence of one or more of nudge severity and nudge priority, nudge scorer 414 generates scores for the nudges based on confidence level, the source system, and/or metadata associated with the recommendation (e.g., data indicating a type of the recommended action, data identifying the recommending back-end system, and/or other metadata fields associated with the recommendation).

In an example, a recommendation could be for a procurement employee to take a recommended action by the end of the day in order to avoid a cancellation of a large volume of product orders. In the example, a high nudge severity score, priority score, and confidence score is associated with the recommended action. Accordingly, the nudge scorer 414 is likely to determine a relatively high score for the recommendation. Another high severity example may be a scenario wherein no approval thresholds have been set by any administrators and an order is placed with an unusually high purchase amount. The recommended action in this example may be to review and approve/deny the purchase request.

In one embodiment, nudge sorter 416 identifies the target speech processing-enabled front end device 108a, 108b and/or other output device to which to send a nudge (e.g., a voice prompt). Nudge sorter 416 sends the nudge data to notification aggregator 312 for summarization and delivery. Additionally, nudge sorter 416 determines nudge recommendations for ad hoc requests. Nudge scorer 414 and/or nudge sorter 416 reorders nudge events and rank nudges according to a predicted and/or user-configured confidence score that represents an estimate of whether a user is comfortable taking the recommended actions via the speech processing-enabled front end devices 108a, 108b. Machine learning techniques used by the nudge sorter 416 and/or nudge scorer 414 include one or more of classification and regression tree analysis (CART), naïve Bayes using prior order history, voice prompt outcomes of similar uses, and/or guided buying rules based on prior outcomes. The nudge scorer 414 uses such machine learning models to generate confidence scores for each candidate voice prompt. In various examples, the nudge scorer 414 may use the confidence scores to limit the number of nudges (e.g., voice prompt recommendations) that are sent to the user during a particular time period, in order to avoid overwhelming the user with information. In one embodiment, nudge evaluation and decider engine 310 includes a nudge manager 504. Nudge manager 504 is described in further detail below in reference to FIG. 5. Generally, nudge manager 504 filters a list of voice prompts to be sent to different speech processing-enabled front end devices (e.g., 108a, 108b, etc.).

Further, deep learning approaches can be used to score and/or rank nudges. For example, in one embodiment, a deep learning network is used to employ a learning rate annealing technique that accumulates knowledge from a broad pool of users that have experienced similar prompts but have had positive or negative reactions. The unsupervised deep learning is used to forecast the probability of application of a prompt to a particular user's need. Additionally, in one embodiment, "drop out" techniques are used to thin a complex decision tree, where the decision tree determines a list of nudge prompts and corresponding user acceptance/rejection of prior prompts as satisfaction weights. The satisfaction weights are gathered over time to determine drop outs. A combination of these techniques may be used to implement a ranking vector of nudge events with importance weights that voice guidance rendering systems use to determine appropriate nudge events. Nudge event ranking and filtering may be used to (1) keep the experience simple, (2) avoid overwhelming the user with too many nudge events, and to (3) boost user confidence in using the speech processing procurement system 100.

Analytics system 314 comprises business reporting 418 and procurement insights 420. Business reporting 418 aggregates spend data from any number of sources and provides transactional reporting of the spend data. Further, business reporting 418 provides metrics visualization and allow for identification of spend patterns. Procurement insights 420 performs inference and machine learning-based prescriptive and predictive analytics. Procurement insights 420 includes automated insights and recommendations based on spend metrics across multiple different dimensions.

Order and shipment tracking manager 318 comprises order/shipment/payment tracking engine 422 and order/shipment/payment/tracking API 424.

Order/shipment/payment/tracking engine 422 tracks and summarizes order and shipment related updates for each organization and may send nudge requests (e.g., recommendations) to nudge evaluation and decider engine 310. Order/shipment/payment/tracking API 424 answers ad-hoc tracking/order status queries using different types of inputs. Additionally, order/shipment/payment/tracking API 424 performs authentication/authorization.

Account management service 322 comprises individual account management services 426 and account management storage 428. The account management services 426 track and summarize orders and shipment-related updates for each organization 102. Additionally, account management services 426 sends nudge requests (e.g., recommendations) to nudge evaluation and decider engine 310. Account management storage 428 creates and updates device details (e.g., location, type, purpose, default settings, preferred language, etc.). Additionally, in various examples, account management storage 428 stores and sends nudge preferences to other components (e.g., nudge evaluation and decider engine 310).

Figure 5:
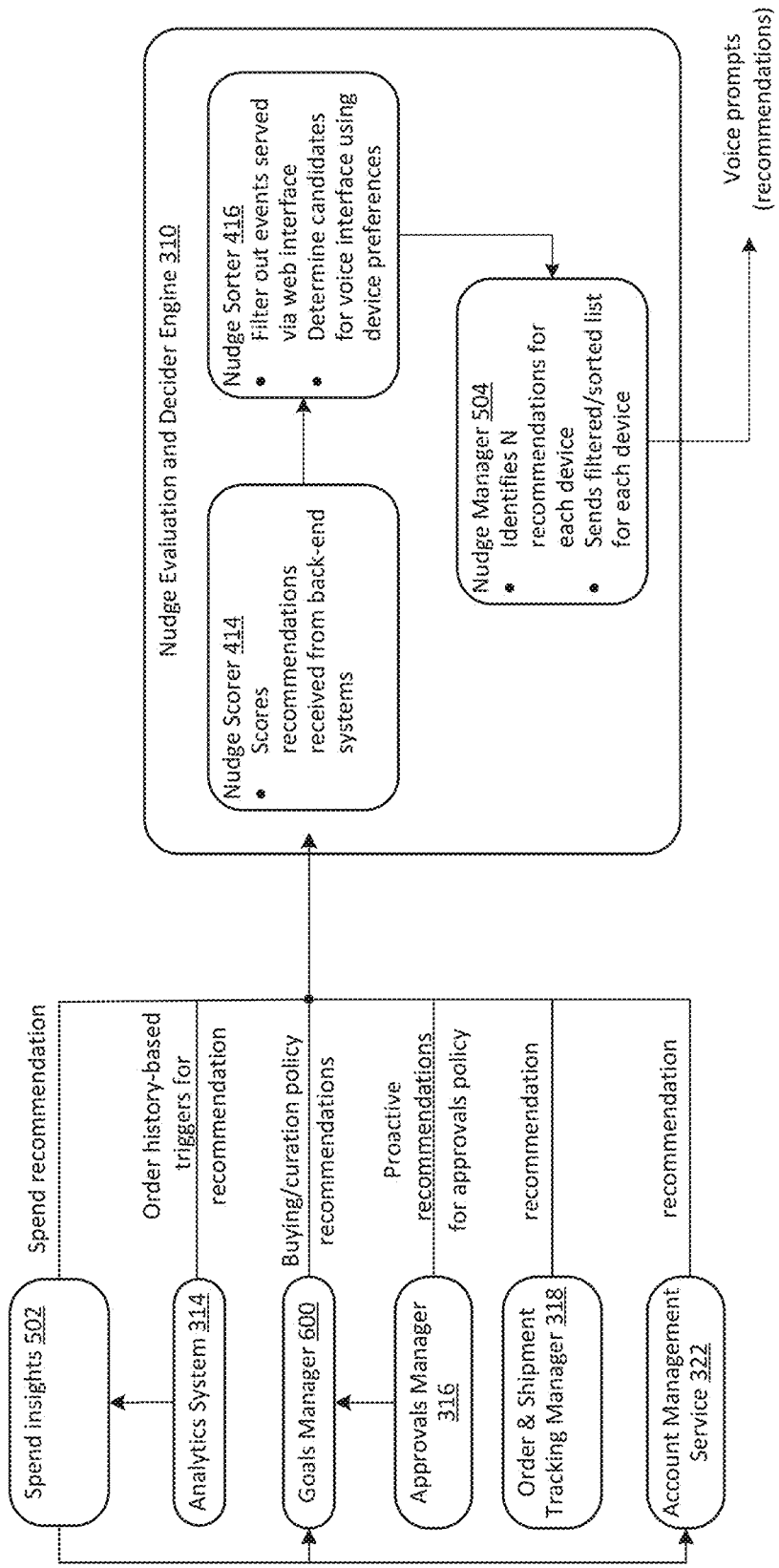
FIG. 5 depicts a block diagram illustrating a nudge evaluation and decider engine, in accordance with various aspects of the present disclosure.

FIG. 5 depicts a block diagram illustrating a nudge evaluation and decider engine, in accordance with various aspects of the present disclosure.

Nudge evaluation and decider engine 310 receives candidate nudge events (e.g., recommendations) from back-end systems and evaluates the candidates on a per-user and/or per-device basis. Nudge events include transient and permanent notifications for providing the user with a collection of pending actions and/or recommendations to take certain actions. Pending Actions is a list of activities which need a response (typically in yes/no form) from the user as part of the user's responsibilities within the scope of the user's employment. It may include pending approvals for orders, budgets, payments, or a permission to be granted on their business account. Recommendation nudges are recommendations from relevant back-end systems for the user to take certain actions for improving their spend performance to achieve current spend goals and/or to improve procurement efficiency. Recommendations include (but are not limited to) business account settings and/or spend controls such as budget/approval thresholds and curation policies. In various examples, recommendations scored and filtered using nudge evaluation and decider engine 310 can be sent to a user device in response to a request from the user (e.g., "Computer, what are my pending actions?") and/or in response to a voice guidance workflow of voice guidance execution engine 308.

The nudge evaluation and decider engine 310 reorders nudge events from authoritative back-end system and ranks them using a predicted or user-configured confidence score that is an estimate of whether the user is comfortable taking recommended actions via the voice interface device (e.g., speech processing-enabled front end devices 108*a*, 108*b*) directly. This ranking of nudge events is used to (1) keep the voice recommendation experience simple, (2) avoid overwhelming the user with a large number of nudge events, and (3) boost user confidence in using the voice guidance interface. The filtered list of nudge events are sent to the notification aggregator 312 which summarizes the notifications and uses nudge delivery preferences to deliver the scheduled notifications to the speech processing-enabled front end devices 108*a*, 108*b*. Ad-hoc queries by the user for any unread actions and/or recommendations are retrieved via the voice guidance execution engine 308 workflow and a nudge evaluation and decider engine 310 API is used for serving the nudges/recommendations associated with the particular device and/or user account. When a user acts on nudges or recommendations from either a web or voice interface, the nudges or recommendations are marked as "Viewed" from the nudge and notification systems to avoid serving the same nudges and/or recommendations again.

FIG. 5 depicts inputs that are sent to the nudge scorer 414. Each back-end system (e.g., analytics system 314, goals manager 600, approvals manager 316, order & shipment tracking manager 318, account management service 322, and spend insights component 502) generates recommendations in a common format. For example, in one embodiment, each recommendation is generated in a JSON format and includes (1) recommendations, and (2) sources. In the formatted data, the "recommendations" property may be the list of recommendations. In various examples, all the scored nudge outputs from the nudge scorer 414 are persisted (prior to filtering) in a NoSQL database so that the nudges may be referred to later. Each scored nudge record may also store audit information describing a time when the nudge was generated, an identifier of the system generating the nudge, an indication of a time at which the nudge was last edited, etc. An example recommendation generated in the JSON format is depicted below:

```
{
  "recommendingSystem": "SPEND_INSIGHTS",
  "recommendations": [
    {
      "id": "abor8n4-murtf84b6x-ktnd1f3b0dhg",
      "type": "APPROVALS_NEW_POLICY_AUTO_APPROVAL",
      "reason_code": "SPEND_PATTERN",
      "creationDate": "2019-09-02T01:01:00Z"
```

```
    "expiresAt": "2019-09-16T01:01:00Z",
    "metadata": {
        "policy": {
            "title": "Auto-approval policy per recommendation",
            "description": "This policy is recommended by the analytics
system for productivity improvement",
            "templateID": "SPEND_THRESHOLD_BASED_AUTO-
APPROVAL",
            "criteria": {
                "name": "spendLimit",
                "arguments": "{\"sellerId\": \"b8a146\", \"approvalThresh-
old\":
\"USD 300\"}",
                "intent": "AUTO_APPROVAL_IF_SPEND_BELOW_THRES-
HOLD",
                "scope": "SELLER"
            }
        }
    }
}
```

In the example format above, each recommendation may be associated with a recommendation identifier from the source back-end system (e.g., the field "id"). The "type" field of the recommendation is the fixed agreed type of the recommendation, as agreed on by the recommending system (e.g., the back-end system sending the recommendation) and core voice guidance system 302. The type field indicates the category of recommendation generated by the back-end system. The reason_code field of the recommendation structure indicates the type of reason to resulting in the recommendation (e.g. SPEND PATTERN, SPEND ANOMALY, PEER ANALYSIS). A combination of reason_code, recommendation's type, and organization scope is used to retrieve a relevant voice memo from voice memo manager 306 (if applicable) by using the voice memo and query engine 408. The memo is played to the user (if a memo pertains to the recommendation) before uttering the recommendation. The above-described details of the recommendation are sent to nudge scorer 414 and are used as inputs for feature pre-processing and machine-learning-based scoring of the recommendation.

In an example, a recommendation may recommend adding two new policies—(1) a first policy to add the auto-approval on the purchases of goods sourced from Acme seller and having a purchase amount below $300, (2) a second recommendation to set the Acme seller as "preferred" for Safety products because the purchases of Safety products from this seller are always approved manually by the approvers. The source field of the JSON format recommendation indicates that the purchase was based on spend metrics from spend insights 502. In the example, a second source leading to the decision of the recommendation is the input from existing policies of goals manager 600. In the example, there may be no auto-approval and preferred-seller policies set in the policies of the goals manager 600. According, the spend insights component 502 submitted the recommendations to add the two policies. Various example inputs to nudge scorer 414 are shown from the various back-end systems in FIG. 5. For example, spend recommendations are sent by spend insights component 502. Order history-based triggers may be used by the analytics system 314 to generate recommendations. Buying/curation policy recommendations are sent by goals manager 600 based on current policies. Recommendations for approval policies are sent by approvals manager 316. Order and shipment related recommendations are sent by order & shipment tracking manager 318. Account-related recommendations are sent by account management service 322.

In an embodiment, each recommendation generated by the back-end systems includes an expiresAt field—storing a timestamp after which the recommendation is no longer sent to the user. Nudge manager 504 may use this timestamp to filter out any expired recommendations. Each back-end system providing recommendations can regenerate the same recommendations in the future if the recommendation was not sent to the user due to timeout. In addition, in some examples, recommendations that are close to expiring (e.g., within a threshold amount of time of timing out) are scored higher to emphasize such recommendations prior to expiration.

In an embodiment, nudge scorer 414 uses a Deep Matrix Factorization (DMF) model for generating the scores for the recommendations. In addition to the recommendation inputs, the nudge scorer 414 also receives feedback from the users describing the effectiveness of past recommendations (e.g., a 1-5 Star rating). The DMF model is trained using a training dataset generated with known fields from the recommendations and back-end system source data as well as corresponding feedback data for each recommendation in the training dataset.

The recommendations from the back-end systems are re-scored periodically (e.g., every x hours (e.g., every 4 hours)). The nudge scorer 414 sends the list of active recommendations for a particular device. The list is ordered by the score (e.g., a fractional value between 0 and 1). The list is transformed into multiple overlapping subsets for each target (website interface, mobile interface, voice interface, etc.) based on the type, number, and/or severity of recommendations that each interface handles. In an example embodiment, all recommendations may be sent to the web interface where users can review, act on, and provide detailed feedback on the recommendations. This recommendation feedback data {String recommendationId, String recommendationType, String sourceSystem, Integer starRating} is fed to the nudge scorer 414 and nudge manager 504 to ensure that the type of recommendations which receive poor ratings (e.g., average ratings of less than 3) are ranked low and thus are not resurfaced by the system.

The nudge sorter 416 may filter out recommendations in the list of recommendations that are to be served via non-voice interfaces (e.g., via a web interface and/or a display). Additionally, nudge sorter 416 may determine candidate recommendations for a particular device based on the device preferences. Typically, the recommendations with the highest scores from nudge scorer 414 and which have not been filtered out by nudge sorter 416 are sent to the relevant speech processing enabled front end device. Nudge manager 504 identifies the N recommendations for each devices and send the list of recommendations (e.g., voice prompts) to the pertinent device.

Each recommendation in the filtered list of the recommendations retrieved by the workflow of the voice guidance execution engine 308 is interpreted. The workflow generates the textual representation of the recommendation using the Neural Machine Translation (NMT) technique which uses a recurrent neural network. The text generation is performed using Deep Learning services.

Figure 6:
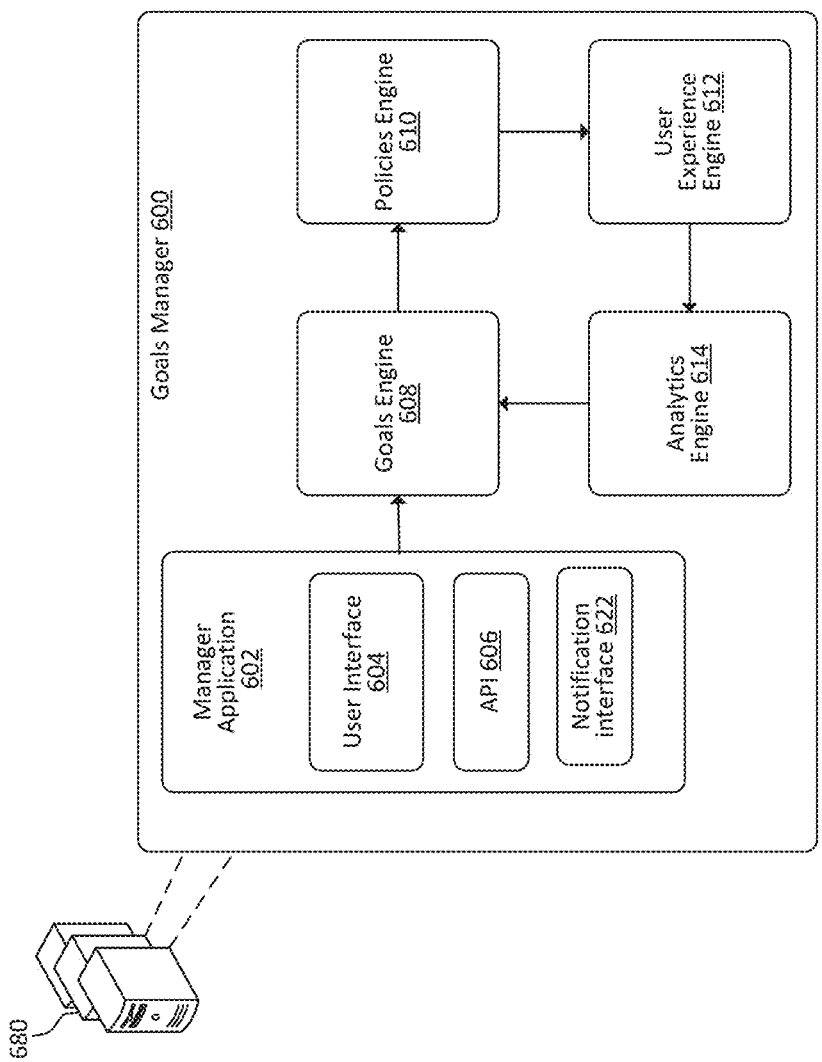
FIG. 6 depicts a block diagram illustrating a goals manager, in accordance with various aspects of the present disclosure.

FIG. 6 depicts a block diagram illustrating a goals manager 600, in accordance with various aspects of the present disclosure. In various examples, goals manager 600 is an example of a back-end component effective to generate recommendations for the nudge evaluation and decider engine 310.

Institutional users (e.g., procurement managers) of the various computing systems described herein are able to specify goals that are translated, using machine learning techniques, into computer-executable policies that are dynamically updated in response to feedback signals indicating real-time progress status (e.g., completion percentage) and/or real-time result data (e.g., data resulting from the policies). In one embodiment, goals are associated with quantitative and/or qualitative attributes and/or dimensions. For example, a quantitative goal attribute is a quantitative metric related to a price of a particular good that is typically purchased by the procurement group of an institution. In this example embodiment, the price is a quantitative attribute. Examples of qualitative goal attributes include identification of preferred sellers of a particular good and/or acceptable shipping times associated with the particular good. For example, the buyer can interact with an online multi-seller competitive marketplace and select between different sellers and/or different types of goods.

In one embodiments, goals are associated with constraints. In at least some embodiments, constraints are elasticities associated with various attributes of the goal data. For example, there may be a goal that a particular quantity of an item be purchased within the current month. Various attributes are associated with the goal and may be specified as goal data. For example, the type of seller, the URL of the seller, the type of goods and/or services described on the website, the shipping times, quality ratings of the item offered by the seller, etc., may be examples of attributes associated with the goal. Various constraints related to such attributes can be specified by a procurement manager. Examples of such constraints may include acceptable tolerances surrounding one or more of the attributes. For example, a shipping tolerance of between 2-4 days, a quality score of X+/−Y, etc. In various examples, goal attributes include time frames for goal completion (along with acceptable tolerances).

In some embodiments, a computer-implemented goals engine is effective to receive the goal data (including the various attributes, constraints, and/or dimension data) and is effective to generate feature vector data representing the goal data. In an embodiment, the goals engine comprises one or more machine learning models effective to receive featurized goal data as input and to generate one or more policies as output. In various examples, the policies can include voice prompts that provide guidance to a buyer and/or to a procurement manager of the speech processing procurement system. As described below, voice prompts can include indications that a particular seller is preferred, according to a current policy determined by the goals engine. In another example embodiment, voice prompts include previously-recorded voice memos that are triggered by a particular action (e.g., an attempt to purchase a restricted item). In another example embodiment, voice prompts include a list of pending actions for attention by the recipient (e.g., a list of purchase requests that need approval prior to execution). In another example embodiment, voice prompts include suggestions for buyers, including preferred sellers, suggested orders, suggested products, etc., determined in accordance with the current policies of the goals engine.

The components of the system depicted in FIG. 6 may be executed by one or more computing devices 680. In various examples, computing devices 680 are configured in communication via a network (e.g., a wide area network, such as the internet, and/or a local area network). As depicted in FIG. 6, a manager application 602 is a web application and/or locally-executing software, comprising a plurality of instructions stored in non-transitory, computer-readable media that when executed by at least one processor of a computing device are effective to program the at least one processor to perform various methods and techniques described herein. For example, manager application 602 includes a user interface 604 through which an upstream user (e.g., procurement manager 106) specifies goals and/or intents on behalf of an institution. For example, as described above, goals may be quantitative and/or qualitative. Goals may include any number of attributes and/or dimensions. For example, the goal may be to achieve a 15% increase in web traffic directed to websites associated with minority-owned businesses over the next calendar year. The example goal includes the quantitative dimensions: 15% and 1 calendar year. Additionally, the example goal includes the qualitative attribute of a category (minority-owned businesses), along with the qualitative attributes of a time span, web traffic, an increase in web traffic, etc. In an embodiment, user interface 604 is a web-based interface (e.g., a browser-based interface), an application interface, a voice interface, etc.

In addition to the dimensions, the procurement manager 106 (or other user) specifies constraints related to the goal. For example, the procurement manager 106 may specify through user interface 604 a +/−3% tolerance for the 15% increase, may specify restrictions (e.g., prohibited websites to which traffic should not be sent), a cap on the amount of web traffic to any particular website, etc. In various examples, systems are configured to automatically specify goals through application programming interface (API) 606. For example, various computing systems may be programmed with logic effective to define goals (including dimensions and/or constraints as described above) and to send data indicating the goals to manager application 602 through API 606.

Manager application 602 represents goals (e.g., dimension data and/or constraint data) as goal data and sends goal data to goals engine 608. Goals engine 608 is a back-end system effective to receive goals data and/or feedback data and generate one or more policies based on the goals data and/or the feedback data. Additionally, goals engine 608 sends recommendations (e.g., recommendations to implement certain policies) to nudge evaluation and decider engine 310. Data representing goals is received by goals engine 608 from manager application 602. A feature representation (e.g., one or more feature vectors) representing the dimensions and/or constraints of the goals is generated and/or extracted and is input into one or more machine learning models of goals engine 608. The machine learning models include deep neural networks trained in a supervised or unsupervised fashion to accept featurized goal data as input and to generate one or more policies that can be used to accomplish the goals. The policies include definitions of the one or more attributes (e.g., specification of credentialed websites, specification of desired number of website visits during a particular time period, etc.), and/or custom logic that is executed for the policy definition.

In various examples, the machine learning models employed by goals engine 608 includes recommender systems effective to form predictions based on past user behavior and/or the behavior of similar users. For example, collaborative filtering is used to determine and recommend relevant content to users. In various examples, collaborative filtering techniques include memory-based approaches and/or model-based approaches. In various examples, model-based approaches include clustering algorithms (e.g., KNN), matrix factorization, and/or deep learning neural networks.

In at least some examples, manager application 602 and/or goals engine 608 are effective to analyze goals data to determine if there is a similarity between one or more goals for which machine learning models have previously been instantiated. For example, if the goal is to increase website by 15% to a first website while maintaining a first level of latency, and a previous machine learning model has been deployed for the same goal (or a similar goal), the same machine learning model may be selected and deployed for the newly-received goal. Such cohort-based machine learning implementations can improve efficiency and may promote machine learning models that have been successful in the past.

Policies may be sent from the goals engine 608 to policies engine 610. Policies engine 610 may store and evaluate policies based on constraints specified in the goal data and/or in the policies themselves. Policies engine 610 may generate inverted indices comprising a mapping of one or more policies to content in a database so that content that is in accordance with the policy/policies is surfaced. In some other examples, policies use heuristics and/or runtime logic to guide users toward content specified by the input goals.

User experience engine 612 is a front end system that may be used by a user such as buyer 104 depicted in FIG. 1. Buyer 104 may be, for example, an employee of an organization and/or entity supplying the goals to manager application 602 (e.g., through procurement manager 106). Procurement manager 106 accesses user experience engine 612 through a web application interface (e.g., through an application interface and/or a browser-based interface) and/or through the various speech processing techniques described herein. User experience engine 612 executes policies stored by policies engine 610 to promote various content (e.g., sellers, goods and/or services, product categories, etc.) in order to realize goals specified through manager application 602.

User experience engine includes a mobile interface, speech interface, web application, programmatic APIs, Augmented reality/virtual reality interfaces, etc. In various examples, user experience engine 612 may execute policies stored by policies engine 610 to generate voice prompts (e.g., nudges) that emphasize goal completion. For example, user experience engine 612 executes code that modifies responses spoken to a user such that only content compliant with goal completion is described. For example, content that is promoted by a current goal is reordered by the computer-executable policy instructions and suggested to buyer 104 through a voice prompt at a particular time. In some further examples, content that is disfavored and/or prohibited by a current goal is filtered out (e.g., removed from a list of results following a search query) when suggesting products to buyer 104. In some further examples, preferred content is tagged to indicate the preferred status (for example, the voice prompt may indicate preferred status of particular items, sellers, etc.). Similarly, disfavored content, blocked, and/or restricted content may be so noted, to indicate the status of the content due to the current goal definition. Policies engine 610 generates computer-executable instructions effective to cause modifications of the content as described herein. For example, policies engine 610 may modify HTML of the search results page and/or modify how a browser displays search results in order to modify the content in accordance with the active goal. In addition, policies engine 610 interacts with workflows of the core voice guidance system to achieve current policy goals.

Modification of returned content may relate to other goal attributes beyond specific web sites and/or products. For example, if free delivery is emphasized over paid delivery as a part of the goal, the user experience engine 612 can modify the returned content according to a current policy to emphasize and/or display only websites offering free delivery of the content and/or service.

Additionally, in examples where the user experience engine 612 relates to a different types of interfaces, different modifications may be appropriate. For example, in a voice interface context, emphasized items are tagged using a special announcement from a voice assistant and/or are listed first, prior to non-goal compliant content. Similarly, in a voice interface context, the user experience engine 612 can provide an audible indication of blocked content (e.g., a voice message indicating that particular content contravenes a current goal). In various other examples, user experience engine 612 may modify search results by including a widget at the top of the HTML results page, wherein relevant preferred content (according to a current goal/policy) is displayed within the widget (in examples where speech processing-enabled front end devices 108a have a display). Additionally, user experience engine 612 can remove content from a results page that would be contrary to a current goal. In various further examples, the user experience engine 612 may modify details of a website of preferred content to include an emblem indicating that the content is preferred and/or an explanation of why the content is preferred (e.g., an identification of the goal and/or policy). In various further examples, the user experience engine 612 may modify existing advertising algorithms to prevent recommendation of blocked and/or restricted content that contravenes a current goal.

In another example, the user experience engine 612 comprises an API used for automated procurement. In such examples, the user experience engine 612 modifies the external API content to interchange the compliance status of requested content so that appropriate actions are taken by the appropriate administrator.

Analytics engine 614 receives feedback data indicating user interactions with content (e.g., through an API). Analytics engine 614 receives feedback from any type of user interface modified by user experience engine 612 (e.g., mobile interfaces, programmatic APIs, voice interfaces, augmented reality interfaces, virtual reality interfaces, etc.). User interactions may include feedback data indicating what suggested products that a user purchased, what types of voice prompts were most successful in changing buyer behavior, what voice prompts the buyer ignored, data related to user interactions (e.g., how much time spent, quantity of an item purchased, purchase price, etc.) or lack of interaction, etc. The feedback data is processed by analytics engine in order to aggregate the data by different dimensions (e.g., website visits within various different periods of time, numbers of visits to a particular type of website (e.g., websites classified as entertainment websites), interactions with various categories of objects associated with a website, etc. In addition, analytics engine 614 also receives feedback from user interfaces modified by user experience engine 612.

Such signals may be provided to the goals engine 608 in real time and are used to dynamically update machine learning models of the goals engine 608. Updating the goals engine 608 includes training new instances of the machine learning models (and/or retraining current models) used to generate policies. In addition, the analytics system may keep track of overall progress toward the goal(s) and can provide such signals to the goals engine 608 and/or to the manager application 602. The goals engine uses overall progress toward a particular goal to train/retrain machine learning models used to generate the policies. For example, Goal A may be to increase purchases from seller A during the current year by 25% and goal B may be to increase purchases from seller B during the current month by 10%. The goals engine may initially generate policies to direct traffic to seller A and seller B (over other websites) by, for example, modifying user search queries, and/or providing voice prompts directed the buyer to these sellers. Halfway through the month, feedback data from the analytics system may indicate that purchases from website A have increased by 30%, while purchases from seller B have only increased by 2%. This feedback data may be used to retrain the machine learning model(s) determining the associated policies. Accordingly, after retraining the model(s) the goals engine determines updated policies that emphasize seller B over seller A based on current progress toward the goal. Additionally, the current up-to-date progress may be provided to notification interface 622 of manager application 602. Notification interface 622 may be a progress dashboard effective to provide access to data indicating current progress toward any goals that have been input via user interface 604 and/or API 606 so that progress status data and/or completion status of the goals can be tracked by procurement manager 106. In various examples, completion status, progress reports, and/or other analytical data are read out to procurement manager 106 at predefined times and/or in response to one or more voice queries for such data.

Returning to FIG. 4, voice memo manager 306 stores recorded voice memos as audio data (e.g., audio file format) and/or as text data (e.g., text file format) prompts in a non-transitory computer-readable memory. Each voice memo is associated with identifier data that is usable to query the voice memo to perform create, read, update, and/or delete (CRUD) operations. Voice memo manager 306 performs text and audio processing to validate the voice inputs for sanitization and validation for abuse avoidance. Additionally, voice guidance workflows may use the voice memo identifier data as placeholders in the workflow policy metadata. Administrators (procurement manager 106 and/or other administrators) can provide personalized guidance to buyers 104. Voice guidance workflows of voice guidance execution engine 308 insert the localized voice memo prompts dynamically in the experience when a TTS module of speech processing 350 generates audio to play back to the user on speech processing-enabled front end devices 108a, 108b.

In various examples, speech processing-enabled front end devices 108a, 108b include displays. In such examples, the text-version of the voice memos can also be displayed on the display screen. Administrators can also use the feature (backed by the voice guidance workflows and voice memo manager 306) to send ad-hoc voice memos to the buyers. Ad-hoc voice memos are then delivered to buyers according to their preferences on the speech processing-enabled front end devices 108a, 108b (e.g., according to account preferences stored by account management service 322 and/or in response to a buyer request for memos). Delivery according to user preference may be a preferred alternative to sending the announcements during a voice shopping experience. Using the various workflows along with speech processing 350 and voice guidance system 124, users within organizations 102 may be able to communicate effectively and hands-free if needed. Additionally, in some examples, users can add items to a shared list and may add custom memos as annotations to the items on the list to convey the content.

Administrators may draft and submit the announcements, voice prompts, and/or voice memos in text form through respective user interfaces. The voice prompts and/or voice memos are stored in storage of voice memo manager 306 and can later be used by the voice memo localization manager 412 to translate the memo into a language preferred by the buyer according to preferences stored in account management service 322. For example, procurement manager 106 may enter the voice prompt in en_GB locale (Great Britain), but the buyer 104 may have de_DE (Germany) or fr_FR (France) as their preferred locale stored in account management service 322. The voice memo localization manager 412 uses the device-level and/or user-level preferences stored by account manager service 322 to translate the input voice prompts/memos into the desired language preferred by buyer 104. When the buyer 104 proceeds through a respective workflow (e.g., purchasing, product searching, insights analysis, order/shipment/refund tracking), the translated prompts may be output by voice guidance execution engine 308 at the appropriate step within the workflow.

As previously described, nudge evaluation and decider engine 310 may include nudge scorer 414 and nudge sorter 416. In an example embodiment, nudge scorer 414 receives the confidence, severity and priority scores (and/or other metadata) from source systems which generated the nudge events (e.g., goals manager 500 and/or voice memo manager 306). The nudge scorer 414 uses heuristics, collaborative filtering (Matrix Factorization), neural networks, and/or other ranking techniques to rank the nudge event candidates. Candidates for output via the voice interface may be decided based on preferences associated with speech processing-enabled front end devices 108a, 108b in account management service 322. Filtered lists of nudge events are sent to the notification aggregator 312 which summarizes the nudge events and delivers the voice prompt data to devices using the voice shopping framework 402 and/or TTS modules of speech processing 350 generally. Each nudge event may be associated with a lifetime (e.g., time to live (TTL) data) after expiration of which the nudge event may be cleared from the nudge system and the devices so that the user does not receive outdated recommendations.

Example voice interactions with the speech processing procurement system are provided below. In the examples below, the administrator (e.g., procurement manager 106) is interacting with the Alexa speech processing system from Amazon Technologies, Inc., of Seattle, Wash.

Pending Actions:
Administrator: Alexa, what are the pending business actions?
Alexa: You have two pending actions. Do you want me to list those?
Administrator: Sure.
Alexa: You have two items in the cart. Five quantities of XYZ Corp. latex glove boxes and one case of microfiber towels. Total purchase price after taxes is $30. Do you want me to submit the purchase order?
Administrator: Yes, please.
Alexa: Thanks. Your order is placed. Next action. Bob's purchase of $300 for 40 medium size Latex glove boxes is pending your approval. Do you want me to send the link to your phone?
Administrator: Yes, please.
Alexa: Thanks. I have sent the approval link to the phone number registered on your account.

Recommendations:
Administrator: Alexa, what are the pending business recommendations?
Alexa: You have three new recommendations. Shall we go through those now?
Administrator: Sure.
Alexa: Based on the purchase volume and approval statistics, I found that safety product purchases from Acme seller are always approved in your group. Do you want to mark Acme seller as a preferred supplier with auto-approval threshold of $300?
Administrator: Yes, go ahead.
Alexa: I marked Acme as your preferred supplier for safety products. Next recommendation. I see that your department purchased safety products from XYZ seller at 80% higher cost than the preferred supplier. Do you want to set an approval threshold of $200 for safety products with a tolerance of 10%?
Administrator: Yes
Alexa: I have added an approval policy as requested. I also sent a link of updated policies to your phone. Next recommendation. I found that Alice purchased $100 worth of beauty products using a shared payment method. Do you want me to send the order details to your phone?
Administrator: No, let me send her a voice memo.
Alexa: Sure, please speak after beep. <beep>
Administrator: <Records the voice prompt>"Hey Alice, hope you are doing well! I see that you purchased some beauty products using the company card. Our company policy does not allow using company card for personal purchases. Please let me know if that was a mistake. Thank you. Alexa, I finished recording. I/ad-hoc voice memo delivery.
Alexa: Your messages was recorded and will be delivered in a few moments. A summary of recommendations and taken actions will be sent to you via email for review. Please visit Business Settings page on your account page for customization of this experience.

Communication of voice memo/nudges to buyers:
Alexa notification ring light shows up on speech processing-enabled front end devices 108*a* based on configured nudge preferences.
Buyer: Alexa, read my notifications.
Alexa: You have 2 new notifications. Ten products from purchase order number ending with 8989 are scheduled to arrive today. You also received have a voice memo from your administrator, Bob. Do you want me to play it?
Buyer: Yes, please.
Alexa: <plays the recorded message from Bob in his voice or in Alexa voice>Hey Alice, hope you are doing well! I see that you purchased some beauty products using the company card. Our company policy does not allow using company card for personal purchases. Please let me know if that was a mistake. Thank you.

Buying Experience
Buyer: Alexa, order Sony DSLR Camera.
Alexa: I see that you wish to purchase a Sony DSLR Camera. I have an automated message from Bob based on your purchase request. <plays Bob's recorded message>Howdy! We recently added blockers on many types of products that we think are not important for our business. If you still need this item, please send me an email or ask Alexa to add this item to our shared list.
Buyer: Alexa, please add that blocked item to the shared list.
Alexa: I have added Sony DSLR Camera to the shared list.

The foregoing examples are merely examples of user interactions that may are possible using the speech processing procurement system described herein. The speech processing procurement system may be used to perform other operations apart from what is specifically described herein (e.g., purchasing actions). Other example operations include finance-related recommendations to change the payment terms, supplier-related recommendations concerning particular suppliers whose products are typically delivered late and/or are returned by purchasers, account restructuring and/or permissions setup recommendations, etc.

Generally, in machine learning models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

Policies may include a set of attributes and/or dimensions associated with the goal data along with runtime logic (e.g., computer-executable operations and/or instructions) and/or heuristics that may be used to achieve the goals specified on the front end. Policies may comprise computer-executable operations that may be executed in order to achieve the goal for which the policy has been implemented. For example, based on the goal data, a computer-implemented procurement policy may determine a price threshold for a particular good, a list of preferred sellers, sellers that should be blocked and/or restricted for a particular time period, etc.

After determining the various computer-implemented procurement policies (sometimes referred to herein as "policies," for brevity), an analytics system may determine downstream user interactions with content surfaced in accordance with the current policies. For example, a policy may be used to provide voice "nudges" to buyers to emphasize particular items, sellers, offers, etc., in order to promote buyer activity that comports with the current policy instantiation.

Accordingly, user search queries that are relevant in some way to an entity may be modified by the policy engine (e.g., according to precomputed data, such as an inverted index) so that results related to the entity specified in the policy are emphasized over those results that are not related to or are contrary to the policy. User interactions may include feedback data indicating what actions were taken by a buyer (such as what products were requested via a voice interface), what voice prompts the user ignored, what voice prompts were acted upon, the length of a dialog initiated in response to a voice prompt, etc. Such signals may be provided to the goals engine in real time and may be used to dynamically update the goals engine. Updating the goals engine may include training new instances of the machine learning models (and/or retraining current models) used to generate policies. In addition, the analytics system may keep track of overall progress toward the goal and may provide such signals to the goals engine. The goals engine may use overall progress toward a particular goal to train/retrain machine learning models used to generate the policies.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance. In various examples, spoken language processing (speech processing) may generate various speech processing confidence data related to outputs of various components of the speech processing system. For example, NLU confidence data may indicate a confidence level that the intents, slots, and/or entities determined by an NLU system are appropriate for a given utterance. Similarly, ASR confidence data may indicate a confidence level of an ASR text transcription of an utterance. In general, speech processing may be described in terms of processing utterances. The term "utterance," as used herein, may include both spoken natural language inputs and other forms of natural language inputs (e.g., input text).

Speech processing may be used in a variety of contexts, including in speech processing enabled devices (e.g., devices employing voice control and/or speech processing "voice assistants") and/or systems. Examples of speech processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Massachusetts, the Cortana system from Microsoft of Redmond, Wash., the Alexa system from Amazon.com, Inc. of Seattle, Wash., etc.

Speech processing-enabled front end devices may include one or more microphones (e.g., far-field microphone arrays) used to transform audio into electrical signals. Speech processing may then be performed, either locally by the speech processing enabled device, by one or more other computing devices communicating with the speech processing-enabled front end device over a network, or by some combination of the speech processing-enabled front end device and the one or more other computing devices. In various examples, speech processing-enabled front end devices may include and/or may be configured in communication with speakers and/or displays effective to output information obtained in response to a user's spoken request or command, and/or to output content that may be of interest to one or more user's. For example, a first speech processing-enabled front end device may receive audio data representing a voice memo from a procurement manager. The procurement manager may request that the audio be sent to a particular buyer. Using the various techniques described herein, the audio data (and/or equivalent audio data output in a preferred language of the buyer) may be output at a second speech processing-enabled device associated with the buyer. Additionally, speakers associated with speech processing-enabled front end devices may be used to output audio representing analytics data (typically consumed by procurement managers), promoted content (e.g., items and/or sellers preferred by a current policy), restricted content, etc.

Storage and/or use of data related to a particular person or device (e.g., contextual data and/or any personal data, such as the preferred language and/or device of a particular user) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A speech-controlled computing system may respond to user utterances by outputting content and/or performing one or more other actions, such as initiating communications (e.g., synchronous phone/video calls and/or asynchronous messaging), playing music, purchasing an item, providing information, calling a taxi, displaying an image, controlling other devices, etc. Generally, input data received by the various speech processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. In addition, skills may include their own NLU models and/or entity recognition models effective to determine skill-specific (and/or domain specific) interpretations of natural language input and relevant actions. Examples of such actions may include text to be processed into output audio data (e.g., synthetic speech) via a text-to-speech (TTS) component, an executable command effective to purchase an item, send a voice memo to a buyer, retrieve current policy and/or buyer analytical data, update a policy, send a suggestion to a particular buyer in response to a related request, etc.

The invocation of a skill by a user's utterance may include a request that an action be taken. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

As previously described, in at least some examples, a "skill," "skill component," and the like may be software that is run by a third party to the herein disclosed speech processing system (e.g., a 3P skill developer), without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

In various examples, a speech processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing a user utterance spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

Figure 7:
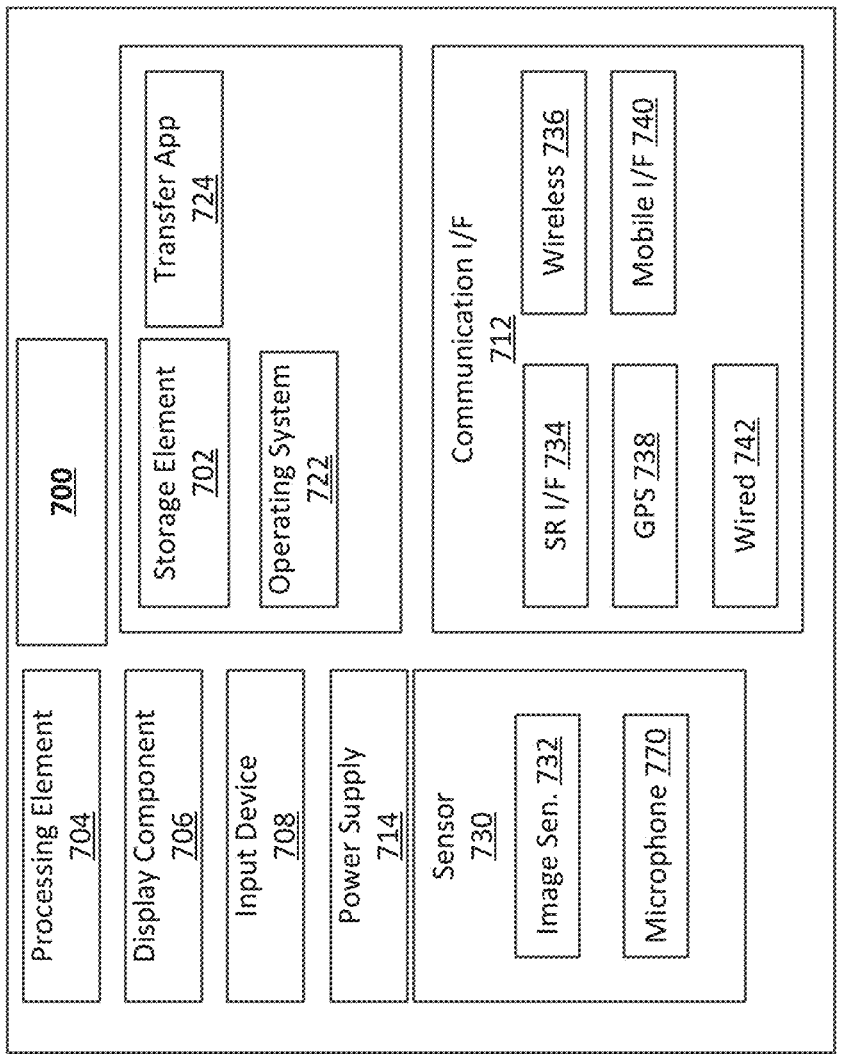
FIG. 7 is a block diagram showing an example architecture of a computing device that may be used in accordance with various embodiments described herein.

FIG. 7 is a block diagram showing an example architecture 700 of a computing device that may be used to perform dynamic filtering of search queries, in accordance with various aspects of the present disclosure. It will be appreciated that not all devices will include all of the components of the architecture 700 and some user devices may include additional components not shown in the architecture 700. The architecture 700 may include one or more processing elements 704 for executing instructions and retrieving data stored in a storage element 702. The processing element 704 may comprise at least one processor. Any suitable processor or processors may be used. For example, the processing element 704 may comprise one or more digital signal processors (DSPs). The storage element 702 can include one or more different types of memory, data storage, or computer-readable storage media devoted to different purposes within the architecture 700. For example, the storage element 702 may comprise flash memory, random-access memory, disk-based storage, etc. Different portions of the storage element 702, for example, may be used for program instructions for execution by the processing element 704, storage of images or other digital works, and/or a removable storage for transferring data to other devices, etc.

The storage element 702 may also store software for execution by the processing element 704. An operating system 722 may provide the user with an interface for operating the computing device and may facilitate communications and commands between applications executing on the architecture 700 and various hardware thereof. A transfer application 724 may be configured to receive images, audio, and/or video from another device (e.g., a mobile device, image capture device, and/or display device) or from an image sensor 732 and/or microphone 770 included in the architecture 700.

When implemented in some user devices, the architecture 700 may also comprise a display component 706. The display component 706 may comprise one or more light-emitting diodes (LEDs) or other suitable display lamps. Also, in some examples, the display component 706 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 700 may also include one or more input devices 708 operable to receive inputs from a user. The input devices 708 can include, for example, a push button, touch pad, touch screen, wheel, joystick, keyboard, mouse, trackball, keypad, light gun, game controller, or any other such device or element whereby a user can provide inputs to the architecture 700. These input devices 708 may be incorporated into the architecture 700 or operably coupled to the architecture 700 via wired or wireless interface. In some examples, architecture 700 may include a microphone 770 or an array of microphones for capturing sounds, such as voice requests. In various examples, audio captured by microphone 770 may be streamed to external computing devices via communication interface 712.

When the display component 706 includes a touch-sensitive display, the input devices 708 can include a touch sensor that operates in conjunction with the display component 706 to permit users to interact with the image displayed by the display component 706 using touch inputs (e.g., with a finger or stylus). The architecture 700 may also include a power supply 714, such as a wired alternating current (AC) converter, a rechargeable battery operable to be recharged through conventional plug-in approaches, or through other approaches such as capacitive or inductive charging.

The communication interface 712 may comprise one or more wired or wireless components operable to communicate with one or more other computing devices. For example, the communication interface 712 may comprise a wireless communication module 736 configured to communicate on a network, such as the network 804, according to any suitable wireless protocol, such as IEEE 802.11 or another suitable wireless local area network (WLAN) protocol. A short range interface 734 may be configured to communicate using one or more short range wireless protocols such as, for example, near field communications (NFC), Bluetooth, Bluetooth LE, etc. A mobile interface 740 may be configured to communicate utilizing a cellular or other mobile protocol. A Global Positioning System (GPS) interface 738 may be in communication with one or more earth-orbiting satellites or other suitable position-determining systems to identify a position of the architecture 700. A wired communication module 742 may be configured to communicate according to the USB protocol or any other suitable protocol.

The architecture 700 may also include one or more sensors 730 such as, for example, one or more position sensors, image sensors, and/or motion sensors. An image sensor 732 is shown in FIG. 7. Some examples of the architecture 700 may include multiple image sensors 732. For example, a panoramic camera system may comprise multiple image sensors 732 resulting in multiple images and/or video frames that may be stitched and may be blended to form a seamless panoramic output. An example of an image sensor 732 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing device(s), as described herein, are exemplary, and may be located as a stand-alone device or may be included, in whole or in part, as a component of a larger device or system.

Figure 8:
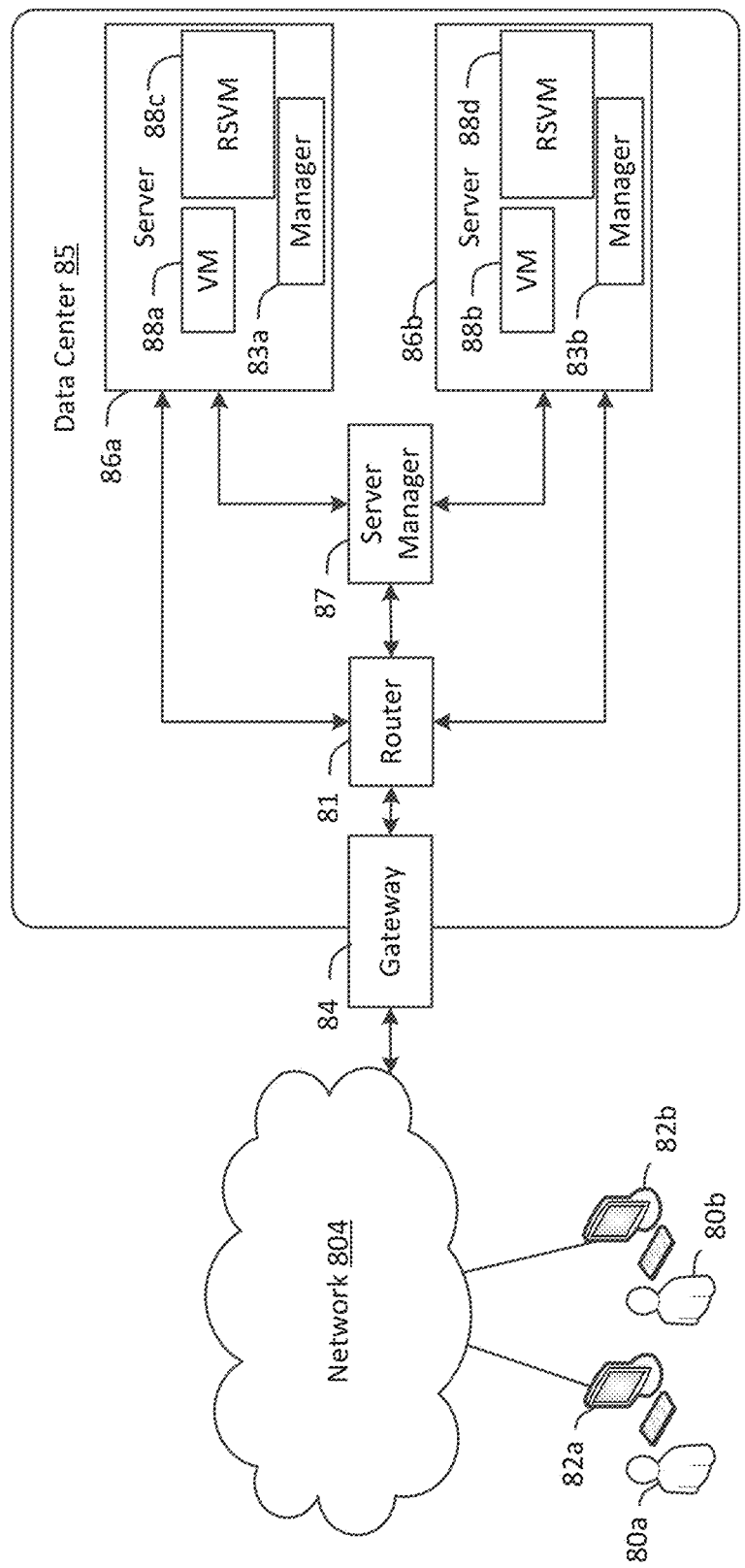
FIG. 8 is a diagram illustrating an example system for sending and providing data that may be used in accordance with the present disclosure.

An example system for determining dynamic computer-executable policies based on goal data will now be described in detail. In particular, FIG. 8 illustrates an example computing environment in which the embodiments described herein may be implemented. For example, the computing environment of FIG. 8 may be used to dynamic policy determination and/or dynamic filtering of search queries as a service over a network wherein one or more of the techniques described herein may be requested by a first computing device and may be performed by a different computing device configured in communication with the first computing device over a network. FIG. 8 is a diagram schematically illustrating an example of a data center 85 that can provide computing resources to users 80*a* and 80*b* (which may be referred herein singularly as user 80 or in the plural as users 80) via user computers 82*a* and 82*b* (which may be referred herein singularly as user computer 82 or in the plural as user computers 82) via network 804. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various machine learning techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 86*a* and 86*b* (which may be referred herein singularly as server 86 or in the plural as servers 86) that provide computing resources. These resources may be available as bare metal resources or as virtual machine instances 88*a-d* (which may be referred herein singularly as virtual machine instance 88 or in the plural as virtual machine instances 88). In at least some examples, server manager 87 may control operation of and/or maintain servers 86. Virtual machine instances 88*c* and 88*d* are rendition switching virtual machine ("RSVM") instances. The RSVM virtual machine instances 88*c* and 88*d* may be configured to perform all, or any portion, of the techniques for improved rendition switching and/or any other of the disclosed techniques in accordance with the present disclosure and described in detail above. As should be appreciated, while the particular example illustrated in FIG. 8 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, network 804 may, for example, be a publicly accessible network of linked networks and possibly operated by various distinct parties, such as the Internet. In other embodiments, network 804 may be a private network, such as a corporate or university network that is wholly or partially inaccessible to non-privileged users. In still other embodiments, network 804 may include one or more private networks with access to and/or from the Internet.

Network 804 may provide access to user computers 82. User computers 82 may be computers utilized by users 80 or other customers of data center 85. For instance, user computer 82a or 82b may be a server, a desktop or laptop personal computer, a tablet computer, a wireless telephone, a personal digital assistant (PDA), an e-book reader, a game console, a set-top box or any other computing device capable of accessing data center 85. User computer 82a or 82b may connect directly to the Internet (e.g., via a cable modem or a Digital Subscriber Line (DSL)). Although only two user computers 82a and 82b are depicted, it should be appreciated that there may be multiple user computers.

User computers 82 may also be utilized to configure aspects of the computing resources provided by data center 85. In this regard, data center 85 might provide a gateway or web interface through which aspects of its operation may be configured through the use of a web browser application program executing on user computer 82. Alternately, a stand-alone application program executing on user computer 82 might access an application programming interface (API) exposed by data center 85 for performing the configuration operations. Other mechanisms for configuring the operation of various web services available at data center 85 might also be utilized.

Servers 86 shown in FIG. 8 may be servers configured appropriately for providing the computing resources described above and may provide computing resources for executing one or more web services and/or applications. In one embodiment, the computing resources may be virtual machine instances 88. In the example of virtual machine instances, each of the servers 86 may be configured to execute an instance manager 83a or 83b (which may be referred herein singularly as instance manager 83 or in the plural as instance managers 83) capable of executing the virtual machine instances 88. The instance managers 83 may be a virtual machine monitor (VMM) or another type of program configured to enable the execution of virtual machine instances 88 on server 86, for example. As discussed above, each of the virtual machine instances 88 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 81 may be utilized to interconnect the servers 86a and 86b. Router 81 may also be connected to gateway 84, which is connected to network 804. Router 81 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a data center 85 is also employed to at least in part direct various communications to, from and/or between servers 86a and 86b. While FIG. 8 depicts router 81 positioned between gateway 84 and data center 85, this is merely an exemplary configuration. In some cases, for example, data center 85 may be positioned between gateway 84 and router 81. Data center 85 may, in some cases, examine portions of incoming communications from user computers 82 to determine one or more appropriate servers 86 to receive and/or process the incoming communications. Data center 85 may determine appropriate servers to receive and/or process the incoming communications based on factors such as an identity, location or other attributes associated with user computers 82, a nature of a task with which the communications are associated, a priority of a task with which the communications are associated, a duration of a task with which the communications are associated, a size and/or estimated resource usage of a task with which the communications are associated and many other factors. Data center 85 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving, by a speech processing procurement system, a plurality of recommendations, wherein each recommendation of the plurality of recommendations comprises a respective voice prompt recommending a respective action;
   determining, using a machine learning model, respective scores for the plurality of recommendations;
   determining a ranked list of the plurality of recommendations based on the respective scores; and
   sending a first recommendation from the ranked list of the plurality of recommendations to a speech processing enabled device, wherein the speech processing enabled device is effective to output the first recommendation as audio, the first recommendation comprising a first voice prompt recommending a first action.

2. The method of claim 1, further comprising:
   receiving a voice command comprising an online purchase request;
   determining a voice guidance workflow associated with the voice command;
   determining, according to the voice guidance workflow, a policy associated with the online purchase request;
   determining that the online purchase request complies with the policy; and
   processing the online purchase request.

3. The method of claim 1, further comprising:
   receiving a voice request for a list of pending actions;
   determining the list of pending actions from the ranked list of the plurality of recommendations; and
   sending the list of pending actions to the speech processing enabled device, wherein the speech processing enabled device is effective to output the list of pending actions as second audio.

4. The method of claim 1, further comprising:
   receiving a voice request to send a voice memo;
   recording first audio data representing the voice memo;
   storing the first audio data in a computer-readable non-transitory memory in association with identifier data; and
   inserting the identifier data into a voice guidance workflow associated with at least one procurement policy.

5. The method of claim 1, further comprising:
   determining an account associated with the speech processing enabled device;
   determining a first preference from the account;
   determining a preferred language from the first preference; and
   translating the first voice prompt from a first language to the preferred language, wherein the speech processing enabled device is effective to output the first voice prompt in the preferred language.

6. The method of claim 1, further comprising:
   receiving a voice command comprising an online purchase request to purchase a first item;
   determining from a procurement policy that the first item is restricted; and
   generating audio data indicating that the first item is restricted by the procurement policy.

7. The method of claim 1, further comprising:
   receiving a first voice command comprising a request to approve a pending transaction;
   receiving a second voice command comprising an approval of the request to approve the pending transaction; and
   sending computer-executable instructions to the speech processing enabled device, wherein the computer-executable instructions are effective to cause the speech processing enabled device to output second audio, wherein the second audio confirms that the pending transaction has been approved.

8. The method of claim 1, further comprising:
   receiving a voice command comprising an online purchase request;
   determining that a previously-recorded voice memo is stored in a memory in association with the online purchase request; and
   sending computer-executable instructions to the speech processing enabled device, wherein the computer-executable instructions are effective to cause the speech processing enabled device to output the previously-recorded voice memo.

9. The method of claim 1, further comprising:
   receiving, from the speech processing enabled device, an instruction to accept the first recommendation, wherein the first action of the first recommendation is effective to update a computer-implemented procurement policy; and
   updating the computer-implemented procurement policy based on the instruction to accept the first recommendation.

10. The method of claim 1, further comprising:
    receiving first audio data representing a user request to purchase a first item;
    generating first text data from the first audio data using automatic speech recognition (ASR), the first text data representing the user request;
    generating first natural language data representing a semantic interpretation of the first text data;
    determining a domain-specific speech processing skill corresponding to the first natural language data;

processing the first natural language data using the domain-specific speech processing skill to determine a first voice guidance workflow; and determining, according to the first voice guidance workflow, that the first item is a restricted item.

11. The method of claim 10, further comprising:

generating voice prompt data using the first voice guidance workflow, wherein the voice prompt data indicates that the first item is restricted;

sending the voice prompt data to a text to speech (TTS) component; and generating, by the TTS component, second audio data that, when played back, indicates that the first item is restricted.

12. A system comprising:

at least one processor; and non-transitory computer-readable memory storing instructions that, when executed by the at least one processor, are effective to:

receive, by a speech processing procurement system, a plurality of recommendations, wherein each recommendation of the plurality of recommendations comprises a respective voice prompt recommending a respective action;

determine, using a machine learning model, respective scores for the plurality of recommendations;

determine a ranked list of the plurality of recommendations based on the respective scores; and send a first recommendation from the ranked list of the plurality of recommendations to a speech processing enabled device, wherein the speech processing enabled device is effective to output the first recommendation as audio, the first recommendation comprising a first voice prompt recommending a first action.

13. The system of claim 12, the non-transitory computer-readable memory storing further instructions that, when executed by the at least one processor are further effective to:

receive a voice command comprising an online purchase request;

determine a voice guidance workflow associated with the voice command;

determine, according to the voice guidance workflow, a policy associated with the online purchase request;

determine that the online purchase request complies with the policy; and process the online purchase request.

14. The system of claim 12, the non-transitory computer-readable memory storing further instructions that, when executed by the at least one processor are further effective to:

receive a voice request for a list of pending actions;

determine the list of pending actions from the ranked list of the plurality of recommendations; and send the list of pending actions to the speech processing enabled device, wherein the speech processing enabled device is effective to output the list of pending actions as second audio.

15. The system of claim 12, the non-transitory computer-readable memory storing further instructions that, when executed by the at least one processor are further effective to:

receive a voice request to send a voice memo;

record first audio data representing the voice memo;

store the first audio data in a computer-readable non-transitory memory in association with identifier data; and insert the identifier data into a voice guidance workflow associated with at least one procurement policy.

16. The system of claim 12, the non-transitory computer-readable memory storing further instructions that, when executed by the at least one processor are further effective to:

determine an account associated with the speech processing enabled device;

determine a first preference from the account;

determine a preferred language from the first preference; and translate the first voice prompt from a first language to the preferred language, wherein the speech processing enabled device is effective to output the first voice prompt in the preferred language.

17. The system of claim 12, the non-transitory computer-readable memory storing further instructions that, when executed by the at least one processor are further effective to:

receive a voice command comprising an online purchase request to purchase a first item;

determine from a procurement policy that the first item is restricted; and generate audio data indicating that the first item is restricted by the procurement policy.

18. The system of claim 12, the non-transitory computer-readable memory storing further instructions that, when executed by the at least one processor are further effective to:

receive a first voice command comprising a request to approve a pending transaction;

receive a second voice command comprising an approval of the request to approve the pending transaction; and send computer-executable instructions to the speech processing enabled device, wherein the computer-executable instructions are effective to cause the speech processing enabled device to output second audio, wherein the second audio confirms that the pending transaction has been approved.

19. The system of claim 12, the non-transitory computer-readable memory storing further instructions that, when executed by the at least one processor are further effective to:

receive a voice command comprising an online purchase request;

determine that a previously-recorded voice memo is stored in a memory in association with the online purchase request; and send computer-executable instructions to the speech processing enabled device, wherein the computer-executable instructions are effective to cause the speech processing enabled device to output the previously-recorded voice memo.

20. The system of claim 12, the non-transitory computer-readable memory storing further instructions that, when executed by the at least one processor are further effective to:
- receive, from the speech processing enabled device, an instruction to accept the first recommendation, wherein the first action of the first recommendation is effective to update a computer-implemented procurement policy; and
- update the computer-implemented procurement policy based on the instruction to accept the first recommendation.

\* \* \* \* \*